(12) United States Patent
Woods et al.

(10) Patent No.: US 8,917,971 B2
(45) Date of Patent: Dec. 23, 2014

(54) METHODS AND SYSTEMS FOR PROVIDING RELEVANT SUPPLEMENTAL CONTENT TO A USER DEVICE

(75) Inventors: Thomas S. Woods, Arllington Heights, IL (US); William J. Korbecki, Lake in the Hills, IL (US)

(73) Assignee: United Video Properties, Inc., Santa Clara, CA (US)

( * ) Notice: Subject to any disclaimer, the term of this patent is extended or adjusted under 35 U.S.C. 154(b) by 11 days.

(21) Appl. No.: 13/341,641

(22) Filed: Dec. 30, 2011

(65) Prior Publication Data

US 2013/0170813 A1 Jul. 4, 2013

(51) Int. Cl.
H04N 5/765 (2006.01)
(52) U.S. Cl.
USPC .......................................................... 386/200
(58) Field of Classification Search
USPC .......................................................... 386/200
See application file for complete search history.

(56) References Cited

U.S. PATENT DOCUMENTS

| | | | |
|---|---|---|---|
| 6,177,931 B1 | 1/2001 | Alexander et al. | |
| 6,388,714 B1 | 5/2002 | Schein et al. | |
| 6,756,997 B1 | 6/2004 | Ward, III et al. | |
| 7,570,943 B2 | 8/2009 | Sorvari et al. | |
| 7,761,892 B2 | 7/2010 | Ellis et al. | |
| 7,773,939 B2 | 8/2010 | Christensen et al. | |
| 7,827,170 B1 * | 11/2010 | Horling et al. | 707/722 |
| 7,865,522 B2 | 1/2011 | Purdy et al. | |
| 8,046,801 B2 | 10/2011 | Ellis et al. | |
| 8,472,705 B2 | 6/2013 | He | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2007/0168208 A1 | 7/2007 | Aikas et al. | |
| 2009/0089177 A1 | 4/2009 | Dayton et al. | |
| 2009/0290813 A1 * | 11/2009 | He | 382/305 |
| 2010/0017265 A1 | 1/2010 | Weingarten et al. | |
| 2010/0030780 A1 * | 2/2010 | Eshghi et al. | 707/6 |
| 2010/0094622 A1 * | 4/2010 | Cardillo et al. | 704/224 |
| 2010/0153885 A1 | 6/2010 | Yates | |
| 2010/0184372 A1 | 7/2010 | Tabaaloute | |
| 2011/0286719 A1 * | 11/2011 | Woods | 386/293 |
| 2012/0030586 A1 | 2/2012 | Ketkar | |
| 2013/0007809 A1 | 1/2013 | Hays | |
| 2013/0104173 A1 * | 4/2013 | Tjio et al. | 725/62 |

* cited by examiner

*Primary Examiner* — Thai Tran
*Assistant Examiner* — Jose Mesa
(74) *Attorney, Agent, or Firm* — Ropes & Gray LLP

(57) ABSTRACT

Systems and methods are provided for presenting a supplemental content asset on a secondary device that is relevant to a primary content asset that is being presented on a primary user device, to enhance the user experience of the primary content asset. A relevant supplemental content asset may be selected based on characteristics of the primary content asset and/or user profile information. Presentation of the supplemental content asset and primary content asset may be coordinated and synchronized by exchange of messages between the primary user device and secondary device.

24 Claims, 15 Drawing Sheets

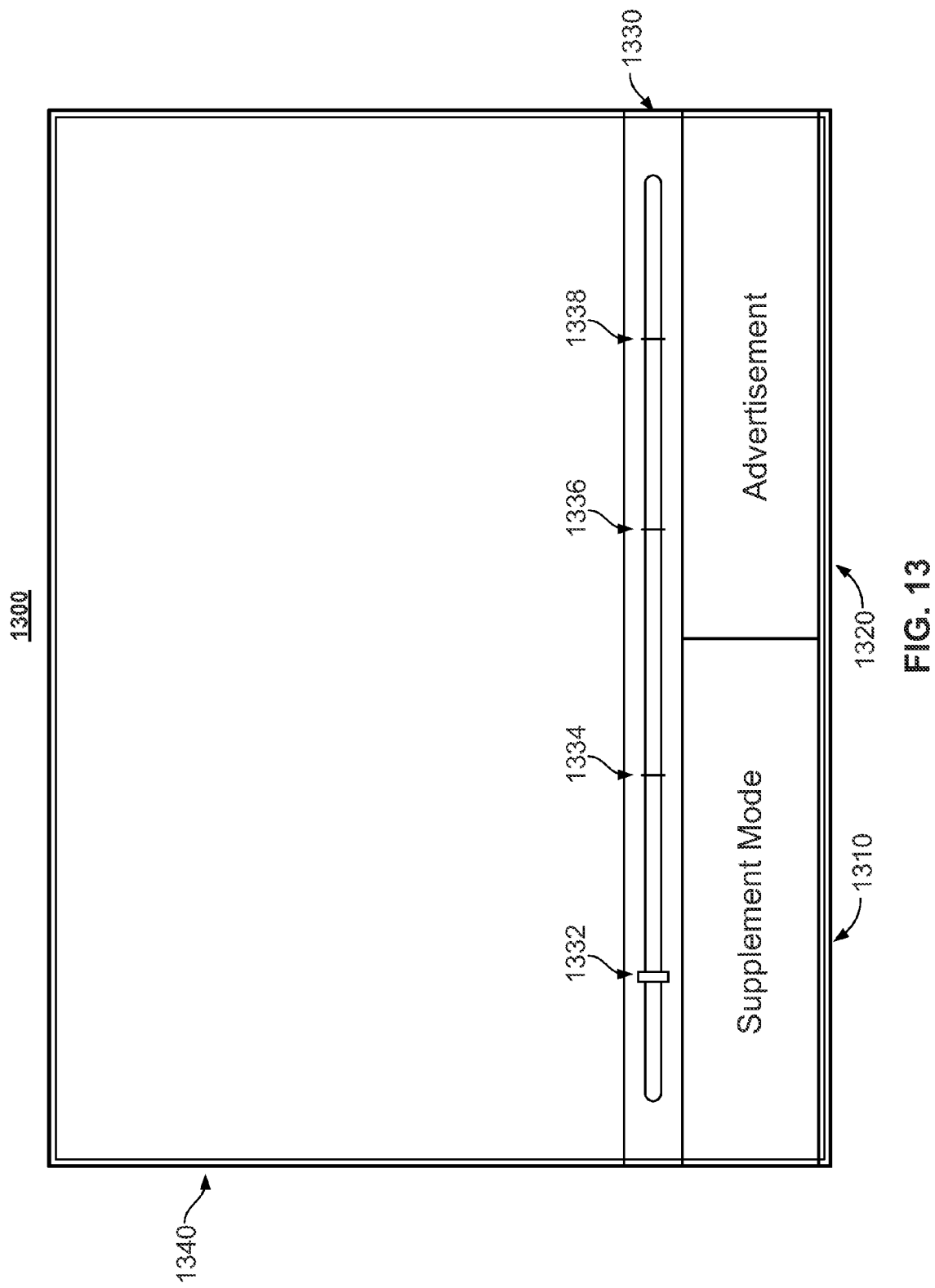

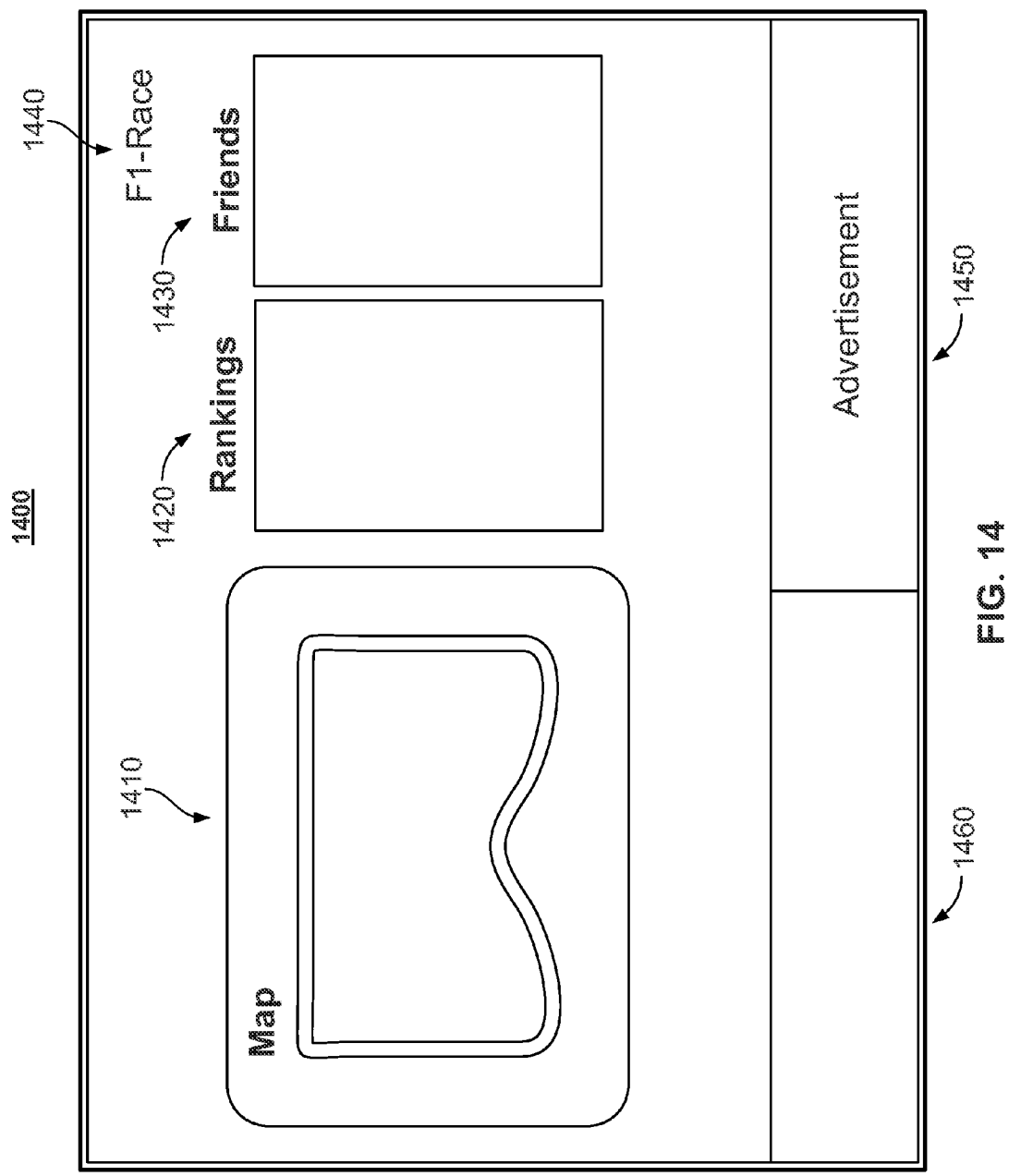

1500

```
INFORMATION FILE

<INFORMATION FILE>
    <METADATA>
        <Media_Guidance_Data>
            <Title>Halo 3</Title>
            <Genre>Action</Genre>
            <ContentType>Video Game</ContentType>
        </Media_Guidance_Data>
    </METADATA>
    <User_Profile_Data>
        <User>John</User>
        <Gender>Male</Gender>
        <Age>32</Age>
    </User_Profile_Data>
    <Supplement Request>
        <ContentType>Video Game</ContentType>
    </Supplement Request>
    <Feature Information>
        <Bass20Hz>5 dB</Bass20Hz>
    </Feature Information>
    <Synchronization>
        <TimeStamp1>00:01:10</TimeStamp1>
        <TimeLineOffset>{00:05:00,00:15:00}
        </TimeLineOffset>
        <ContentIndex>{1,2,3}</ContentIndex>
    </Synchronization>
    <Capabilities>
        <Supported1>Audio</Supported1>
        <Supported2>Video</Supported2>
    </Capabilities>
    <PlayBack>
        <Status>Paused</Status>
        <PlayTime>00:23:10</Playtime>
        <TotalTime>01:10:01</TotalTime>
    </PlayBack>
</INFORMATION FILE>
```

1510 — <METADATA>
1520 — <Media_Guidance_Data>
1530 — <User_Profile_Data>
1540 — <Supplement Request>
1550 — <Feature Information>
1560 — <Synchronization>
1561 — <TimeStamp1>
1562 — <TimeLineOffset>
1563 — <ContentIndex>
1570 — <Capabilities>
1571 — <Supported1>
1572 — <Supported2>
1580 — <PlayBack>
1581 — <Status>
1582 — <PlayTime>
1583 — <TotalTime>

FIG. 15

METHODS AND SYSTEMS FOR PROVIDING RELEVANT SUPPLEMENTAL CONTENT TO A USER DEVICE

BACKGROUND OF THE DISCLOSURE

This application relates to supplementing primary content assets accessed by a primary user device, by presentation of supplemental content assets on a secondary device.

Traditional systems allow users to access content assets for viewing and play back from a single device or a single system. For example, a traditional home entertainment system may include television equipment, stereo equipment, set-top boxes and digital media disc players. The user equipment of the traditional home entertainment system are operated independently to access content assets, and do not interact.

Traditional systems do not enable user devices to supplement content assets accessed by other devices. For example, in response to play back of a song on a portable media device, a traditional home entertainment system is unable to play back a music video from its own content library related to the song.

SUMMARY OF THE DISCLOSURE

In view of the foregoing, methods and systems are provided for enabling interaction between two different user devices to present a supplemental content asset. A primary content asset accessed by a primary user device may be supplemented by presenting a supplemental content asset on a secondary device. As an example, a system may include a television, a set-top box and a stereo. A user may tune the stereo to a radio station and play a popular song on the stereo. In response to the playing of the song, the television may supplement the popular song by displaying a slide show of images related to the popular song. The slide show may be provided to the television from a set-top box that accessed the images from the Internet.

A user may operate a primary user device to access a primary content asset. In response to the accessing of the primary content asset by the primary user device, a secondary device may search for a supplemental content asset related to the primary content asset from a library of files stored locally on the secondary device, or a library of files stored remotely. The secondary device may select the most relevant content asset to supplement the primary content asset accessed by the primary user device. Depending on usage, a user device may act as a primary device or act as a secondary device. For example, when a first user device is used to access a primary content asset that is to be supplemented by a second user device, the first user device may be a primary device, and the second user device may be a secondary device. Alternatively, when the first user device is used to provide a supplemental content asset to a primary content asset that is accessed on the second user device, the first user device may be the secondary device, and the second user device may be the primary device.

The supplementing of a primary content asset may be performed in response to detection by a secondary device, of a primary device within a proximity of the secondary device, or vice versa, in response to detection by a primary device, of a secondary device within a proximity of the primary device. A proximity may refer to a physical proximity. As referred to herein, a physical proximity may refer to a measurable range within which detecting circuitry of an electronic device is able to detect a minimum signal. A measurable range may include a wireless range within which a first wireless device is able to detect a wireless signal received from a second wireless device, a visual detection range within which a biometric device such as a camera is able to resolve two points, an audio detection range within which a microphone is able to detect audio, or any other suitable measurable range or any combination thereof.

The presentation of a supplemental content asset on a secondary device may be coordinated with the presentation of a primary content asset on a primary device, in response to a detection event. For example, in response to detecting a primary device, a secondary device may receive play back information about a primary content asset on the primary device. As referred to herein, "play back information" may include an elapsed play back time of the primary content asset, and status information about whether the primary content asset is paused or played back. In response to receiving the play back information, the secondary device may advance the start time of the supplemental content asset to compensate for the elapsed play back time of the primary content asset. In this way, the presentation of the supplemental content asset can match the presentation of the primary content asset.

In some embodiments, the primary user device may detect a secondary device, and receive a device information message from the detected secondary device. The primary user device may determine capabilities of the secondary device based on the received device information message. In response to receiving a user request to access a content asset, the primary user device may generate a content information message that includes a characteristic of the accessed primary content asset. The content information message may then be transmitted to the secondary device.

In some embodiments, the primary user device may generate a message template based on the determined capabilities of the secondary device. The message template may reduce the amount of irrelevant information to be transmitted to a secondary device. The primary user device may generate a content information message based on the message template. In some embodiments, in response to transmitting a content information message to a secondary device, the primary user device may receive a feedback information message from the secondary device that includes metadata or timing information about a supplemental content asset that is accessible on the secondary device.

It may be desirable to supplement one type of content asset with a different type of content asset. In some embodiments, the primary user device may select a secondary device to provide a supplemental content asset based on the determined capabilities of the secondary device, and the type of supplemental content asset desired.

In some embodiments, the primary user device may generate a synchronization information message that includes information comprising metadata or timing information used to coordinate playback of the primary content asset and supplemental content asset. The primary user device may transmit the generated synchronization information message to the secondary device.

In some embodiments, a characteristic of a content asset may include metadata, timing information, user profile information, mood information or feature information. The feature information may include feature vectors, audio features or visual features.

In some embodiments, a secondary device may receive an electronic communication from the primary user device, including information about a primary content asset accessed at the primary user device. The secondary device may then access a database to search for content listings that are relevant to the primary content asset. The relevancy may be determined by comparing a characteristic of a content listing accessed from the database to a characteristic of the primary content asset.

In some embodiments, the secondary device may generate the database of content listings based on content that is accessible to the secondary device. In some embodiments, the secondary device is a nexus device that may communicate with one or more slave secondary devices. The nexus device may receive information about content accessible to the slave secondary device and update the database of content listings to include information about the content accessible to the slave secondary device. The content available to the slave secondary device may be provided as a supplemental content asset to the primary content asset accessed by the primary user device.

In some embodiments, the secondary device may determine if a content listing accessed from the database is relevant to the primary content asset by analyzing or comparing information such as metadata or feature information. If the feature information of the primary content asset and content listing are different types, the feature information may be preprocessed and normalized into formats that may be compared.

In some embodiments, a secondary device may retrieve information from a social network account of a user of the primary user device from a web server, and determine relevancy of a content listing based in part on the mood information. In some embodiments, the secondary device may determine relevancy of a content listing based on mood information associated with the primary content asset accessed on the primary user device.

In some embodiments, a primary user device may communicate with a web server to post mood information to a social network account of a user of the primary user device. The mood information to be posted may be received as input to the primary user device from the user, or determined from a primary content asset accessed by the primary user device.

In some embodiments, the supplemental content asset may be an advertisement related to the primary content asset. This may be a form of context-based advertising based on the characteristics of the primary content asset accessed by the user. In some embodiments, the supplemental content asset may be a related content that enhances the listening or viewing experience of the user accessing the content. For example, in response to play back of a song on a portable mp3 player, television equipment may display a slide show of related images. In some embodiments, a secondary device may receive a user request to purchase a supplemental content asset from a content source.

In some embodiments, several content may be used to supplement the play back of an accessed primary content asset. For example, several content files may be added to a playlist that supplements a primary content asset.

BRIEF DESCRIPTION OF THE DRAWINGS

FIG. 13 illustrates an example of a display screen that may be shown to a user on a secondary device displaying a supplemental content asset in accordance with some embodiments of the present disclosure;

FIG. 14 illustrates an example of a display screen that may be shown to a user on a secondary device that displays a supplemental content asset in accordance with some embodiments of the present disclosure.

FIG. 15 illustrates an example of a data structure of an information message for transmitting information between a primary user device and secondary device in accordance with some embodiments of the disclosure.

DETAILED DESCRIPTION OF EMBODIMENTS

Figure 1:
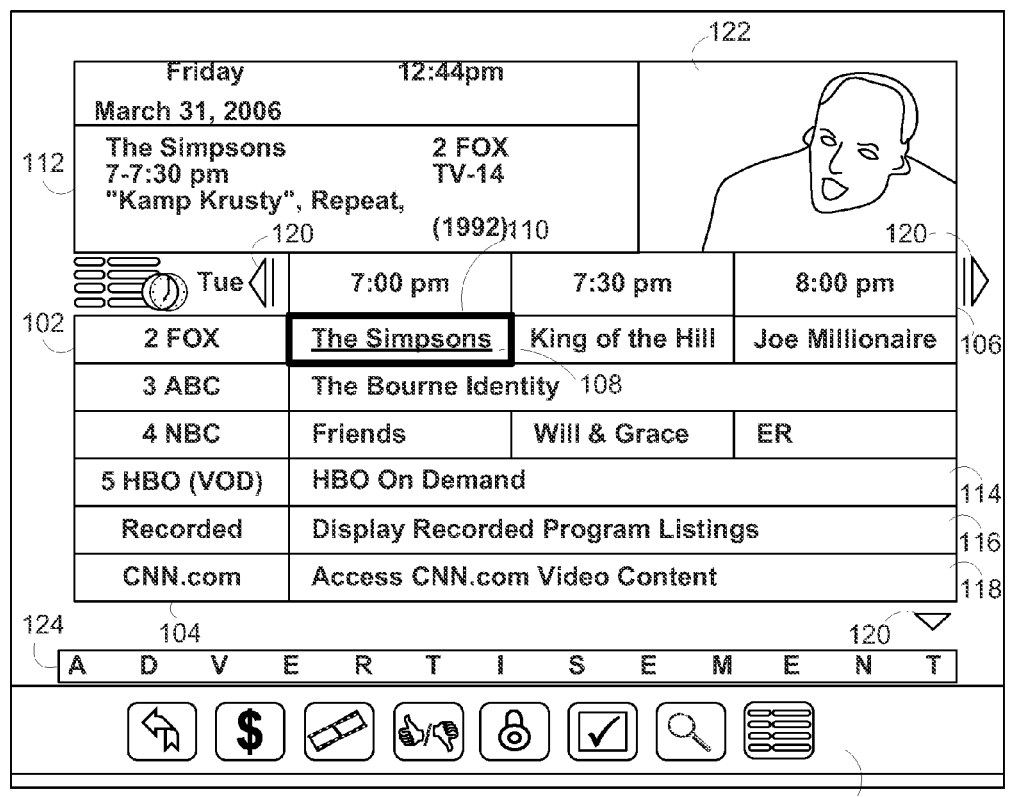
FIG. 1 shows an illustrative interactive media guidance application display screen in accordance with some embodiments of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
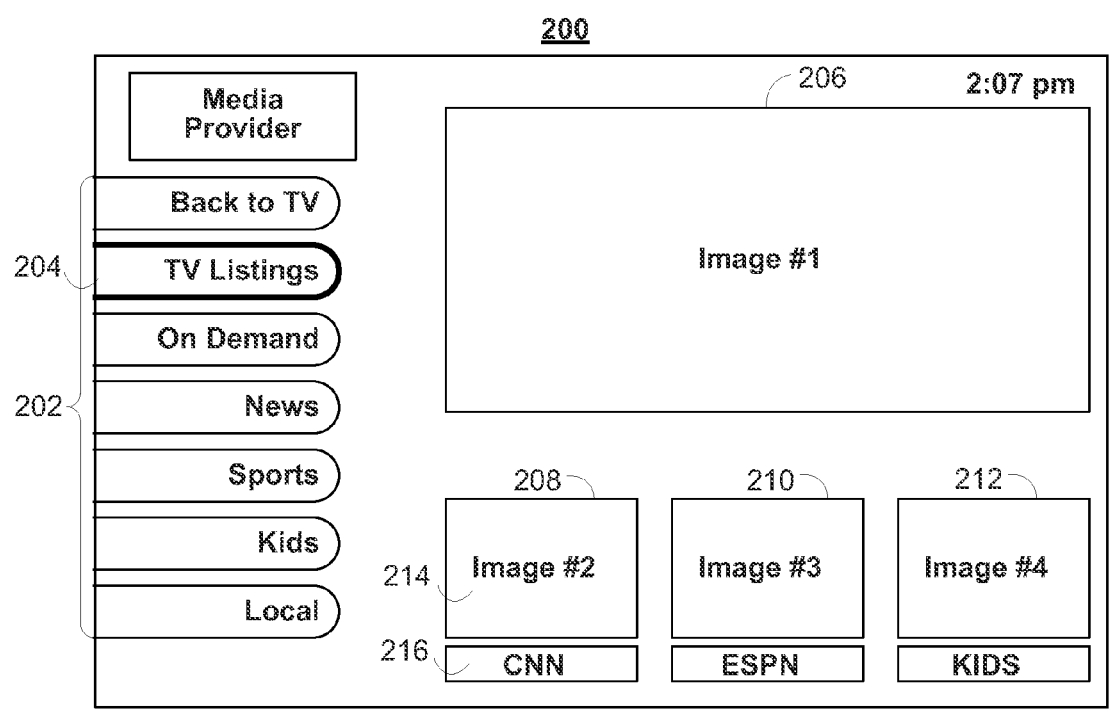
FIG. 2 shows another illustrative interactive media guidance application display screen in accordance with some embodiments of the present disclosure.

FIGS. 1-2 show illustrative display screens that may be used to provide media guidance data. The display screens shown in FIGS. 1-2 and 9-14 may be implemented on any suitable user equipment device or platform. While the displays of FIGS. 1-2 and 9-14 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font/size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

User profile information may be defined as information that indicates characteristics of a particular user. User profile information may include name, gender, age, race, preference, mood, status or any other suitable information indicating characteristics of a user. Methods and systems for using user profile information have been described in detail in U.S. Pat. No. 6,177,931, issued Jan. 23, 2011, which is hereby incorporated by reference herein in its entirety. Preference information may indicate favorite media related information. For example, preference information may include a user's favorite genre or category. Preference information may indicate a user's most commonly accessed primary content asset or content assets. For example, preference information may indicate that a user accesses a particular song or set of songs more often than any other songs on an mp3 player. User devices may use the user profile information to search for a relevant supplemental content asset.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
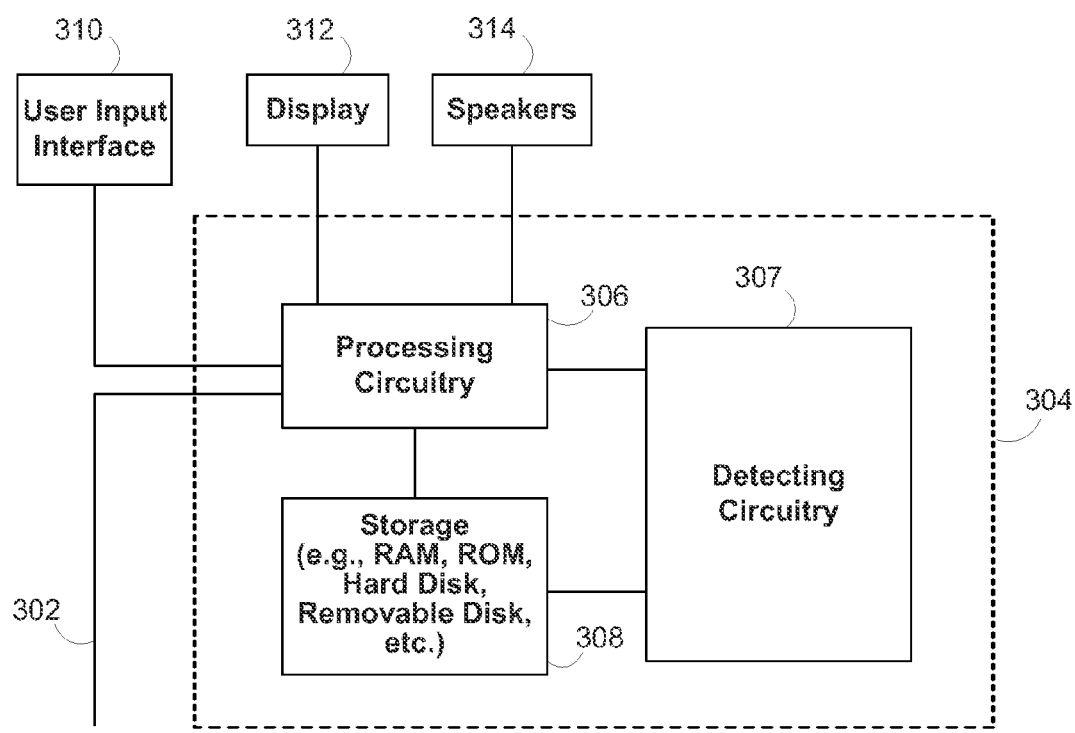
FIG. 3 illustrates an example of a user device that may provide a supplemental content asset in accordance with some embodiments of the present disclosure.

Users may access content and the media guidance application (and its display screens described above and below) from one or more of their user equipment devices. FIG. 3 shows a generalized embodiment of illustrative user equipment device 300. The embodiment generalized by FIG. 3 may operate as a primary user device or a secondary device. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, detecting circuitry 307, and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, a wireless modem, a local area networking (LAN) Ethernet adapter, a wireless LAN adapter, a wireless bluetooth adapter, USB port, or wireless USB port for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

In some embodiments, control circuitry 304 may include detecting circuitry 307 which may be capable of detecting and/or identifying a user or users without requiring the user or users to make any affirmative actions by using any suitable biometric recognition technique, such as facial recognition, heat signature recognition, odor recognition, scent recognition, body shape recognition, voice recognition, behavioral recognition, or any other suitable biometric recognition technique. In some embodiments detecting circuitry may detect or identify a user device using wireless detection techniques, as will be described in further detail below. For example, detecting circuitry 307 may detect and identify users using these techniques while the users are within a measurable range to an electronic device. The measurable range may be limited by capability of the detecting circuitry to resolve or measure features. For example, the measurable range from which a camera may resolve two spaced points may be limited based on optical resolution of the camera. For example, the measurable range from which a wireless antenna may be able to detect a received signal above background noise may depend on the initial intensity of the transmitted signal and an absorption coefficient of the surrounding transmission medium. In some embodiments, users may be detected and/or identified using any other suitable biometric recognition technique that may in some embodiments require the users to be within a measurable range to an electronic device, for example, iris recognition, retinal recognition, palm recognition, finger print recognition, or any other suitable technique.

Detecting circuitry 307, by using wireless detection techniques, may also be capable of detecting and/or identifying a user device (e.g., a mobile device, such as an RFID device or mobile phone). Detecting circuitry 307 may recognize and identify such a device using any suitable means, for example, radio-frequency identification, Bluetooth, Wi-Fi, WiMax, Internet protocol, infrared signals, any other suitable Institute for Electrical and Electronics Engineers (IEEE), industrial, or proprietary communication standards, or any other suitable electronic, optical, or auditory communication means. In some embodiments, detecting circuitry may detect a user. For example, detecting circuitry 307 may determine that a user is within a detection region of an electronic device, identify the user, and add the user to a list of active users at the electronic device.

The detection and identification of users as described herein does not require any affirmative action on the part of the user beyond, in some embodiments, the configuration of such methods and systems. For example, any detection and identification of users is done automatically by electronic devices. In some embodiments, detecting circuitry may detect a user device. For example, detecting circuitry 307 may determine by using wireless detection techniques that a user device is within a wireless detection region, and add the user device to a list of user devices at the electronic device. In some embodiments, detecting circuitry 307 may detect a user using a biometric technique, and in response to detecting a user, detect and identify a user device using wireless techniques. For example, a secondary device may detect a user, and query information about primary content assets on the primary user device. For example, detecting circuitry 307 of an electronic device may detect a user on a biometric device such as a camera, and in response to detecting the user, wirelessly detect a primary user device corresponding to the detected user. If a primary user device is detected, the secondary device may communicate with primary device to provide supplemental content. Further embodiments and implementations will be discussed in greater detail below.

Detecting circuitry 307 may include any suitable hardware and/or software to perform detection and identification operations. For example, detecting circuitry 307 may include infrared, optical, and/or radio-frequency receivers and/or transmitters. Detecting circuitry 307 may additionally, or alternatively, include one or more microphones and/or cameras to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultra-violet information, or any other suitable type of information. Detecting circuitry 307 may additionally, or alternatively, include palm, fingerprint, and/or retinal readers for detecting and/or identifying users. In some embodiments, detecting circuitry may communicate to processing circuitry 306 and/or storage 308 various detection and/or identification mechanisms indicating whether a user is detected and/or identified at a particular device.

In some embodiments, detecting circuitry 307 may use any suitable method to determine the distance, trajectory, and/or location a user is at in relation to an electronic device. For example, an electronic device may use received signal strength indication (RSSI) from a user's mobile device to determine the distance the user is to the electronic device. For example, RSSI values may be triangulated to determine a user's location. The electronic device may also use, for example, triangulation and/or time difference of arrival determination of appropriate information to determine a user's location in relation to an electronic device. For example, time difference of arrival values of sounds emanating from a user may be determined. In some embodiments, any suitable image processing, video processing, and/or computer vision technique may be used to determine a user's distance, trajectory, and/or location in relation to an electronic device. A user's distance, trajectory, and/or location in relation to an electronic device may be determined using any suitable method.

In some embodiments, processing circuitry 306 may determine a location based on global positioning system (GPS) measurements, or, in the case of cellular telephones, measurements based on cell-tower signals, done by detecting circuitry 307. Processing circuitry 306 may use these measurements to determine location coordinates which may be transmitted to other electronic devices.

Memory may be an electronic storage device provided as storage 308 that is part of control circuitry 304. As referred to herein, the phrase "electronic storage device" or "storage device" should be understood to mean any device for storing electronic data, computer software, database, or firmware, such as random-access memory, read-only memory, nonvolatile memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Storage 308 may be used to store a library of content files, a database of content files, a database of content listings, or any other suitable information. A content listing may include information about a content file. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. User input interface 310 may communicate with one or more media devices. In some embodiments, user input interface 310 may be a remote control with pressure-sensitive buttons. Control circuitry 304 may recognize different amounts of pressure applied to the pressure-sensitive buttons and adjust navigation through, for example, the guidance application. For example, the amount of pressure applied may adjust the speed of scrolling through guidance application listings, such that when less pressure is applied, the listings scroll more slowly and when more pressure is applied, the listings scroll more quickly. The pressure-sensitive buttons may control any portion of the guidance application or an electronic device in any suitable manner.

Figure 4:
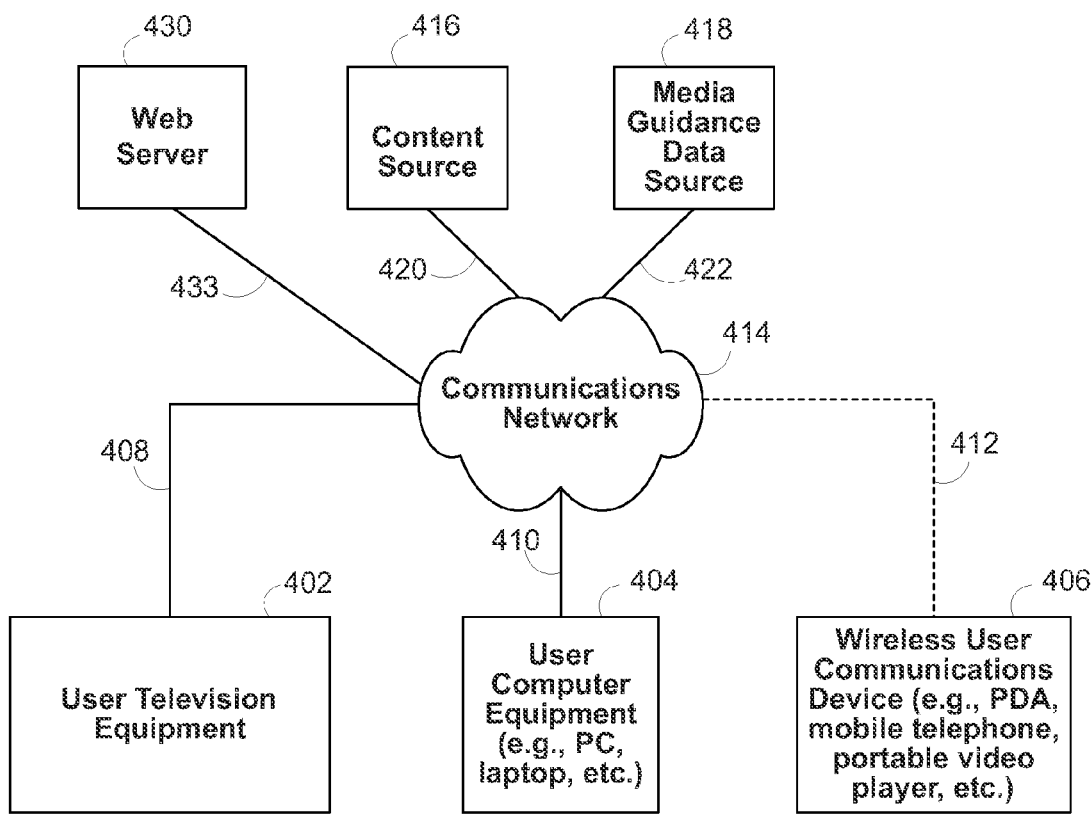
FIG. 4 illustrates an example of a system that provides supplemental content assets in accordance with some embodiments of the present disclosure.

In some embodiments, user input interface 310 may communicate with media devices using a communications path as described in reference to FIG. 4. For example, user input interface 310 that may be incorporated into a user's mobile phone may communicate with media devices using a wireless communications path. In some embodiments, user input interface 310 may communicate with an intermediate device that may convert any suitable communication means to any other suitable communication means. For example, a user may attempt to scroll through a guidance application using the user's mobile phone incorporated with user input interface 310. User input interface 310 may output wireless packets to communicate with user's scroll instructions. An intermediate device may receive the wireless packets and, in turn, transmit infrared packets to control circuitry 304.

In some embodiments, user input interface 310 may store, transmit, and/or receive information associated with and/or identifying a particular user or users. This information may be used by detecting circuitry 307 to detect and/or identify that the user associated with the information is within a detection region of an electronic device. The user may then be added to a list of active users at the electronic device and/or logged into the electronic device.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

In some embodiments, control circuitry 304 may retrieve one or more user selected programs that are provided by a content source. Control circuitry 304 may instruct a storage device to store the content provided by the content source during the scheduled broadcast time (e.g., having a scheduled start time and a scheduled end time) of the program selected for recording.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled, allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, ethernet cables, wireless paths (e.g., Bluetooth, infrared, IEEE 802-11x, wireless USB, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

System 400 may include a web server 430 that may host a website, social network, an Internet database of information, or any other suitable online service. User equipment 402 may receive through communications network 414 information (e.g., in real-time or during predefined time intervals) from one or more online services hosted by web server 430. Examples of social networks include Facebook, MySpace, and Google+. Facebook is a trademark owned by Facebook Incorporated. MySpace is a trademark owned by Specific Media LLC. Google+ is a trademark owned by Google Incorporated. For example, mood information may be posted to and retrieved from a social network account of a user hosted on a web server. The mood information may be used by processing circuitry of a primary user device or by processing circuitry of a secondary device to make recommendations of content relevant to the mood information. In some implementations, processing circuitry 306 may query an online service by issuing a communication to web server 430. In particular, processing circuitry 306 may query the online service for mood information associated with a user.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Content source 416 may also include a local media server used to store different types of content, in a location near the user devices. In some embodiments, content source 416 and media guidance data source 418 may be integrated into a user device. For example, a user television equipment 402, such as a set-top box, may contain a media server that includes content source 416 and media guidance data source 418.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client component of the application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul.

11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications or the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

A supplemental content asset may be any content that may be accessed by a secondary device to accompany a primary content asset that has been accessed by a primary user device, and is related to the primary content asset. The supplemental content asset may be any suitable content that has some relation to a primary content asset being provided on the primary user device. For example, the primary content asset and the supplemental content asset may be related based on similar subject matter, tempo, or any other suitable relationship. Further descriptions of possible relationships are provided below.

Providing a supplemental content asset may be any action performed by either a primary user device accessing a primary content asset, a secondary device accessing a supplemental content asset related to the primary content asset, or both the primary user device and the secondary device. The term "supplementing content assets", "supplementing of content assets", or other similar terms may be used in lieu of "providing a supplemental content asset". The providing of supplemental content asset may be performed by an application running on a user device. In some embodiments, the application may be an interactive media guidance application. In some embodiments, the application may be a widget. Depending on whether a user device is accessing a content asset that may be supplemented by another device, or is accessing a supplemental content asset to accompany a content asset accessed on another device, the application or different applications may be used.

Metadata is descriptive information that may be contained in the header for a content file. Metadata may include title, genre, duration, category, file type, file format, timing information, feature information, or any other suitable information. The timing information of metadata may include lengths of a content asset, such as length of a song or video. The metadata may vary depending on the type of content. For example, image files may contain information about color maps and resolution of the images. Audio files may include information about the type of audio encoding. Video files may include information about the type of video encoding and indices within the file corresponding to different scenes.

Figure 5:
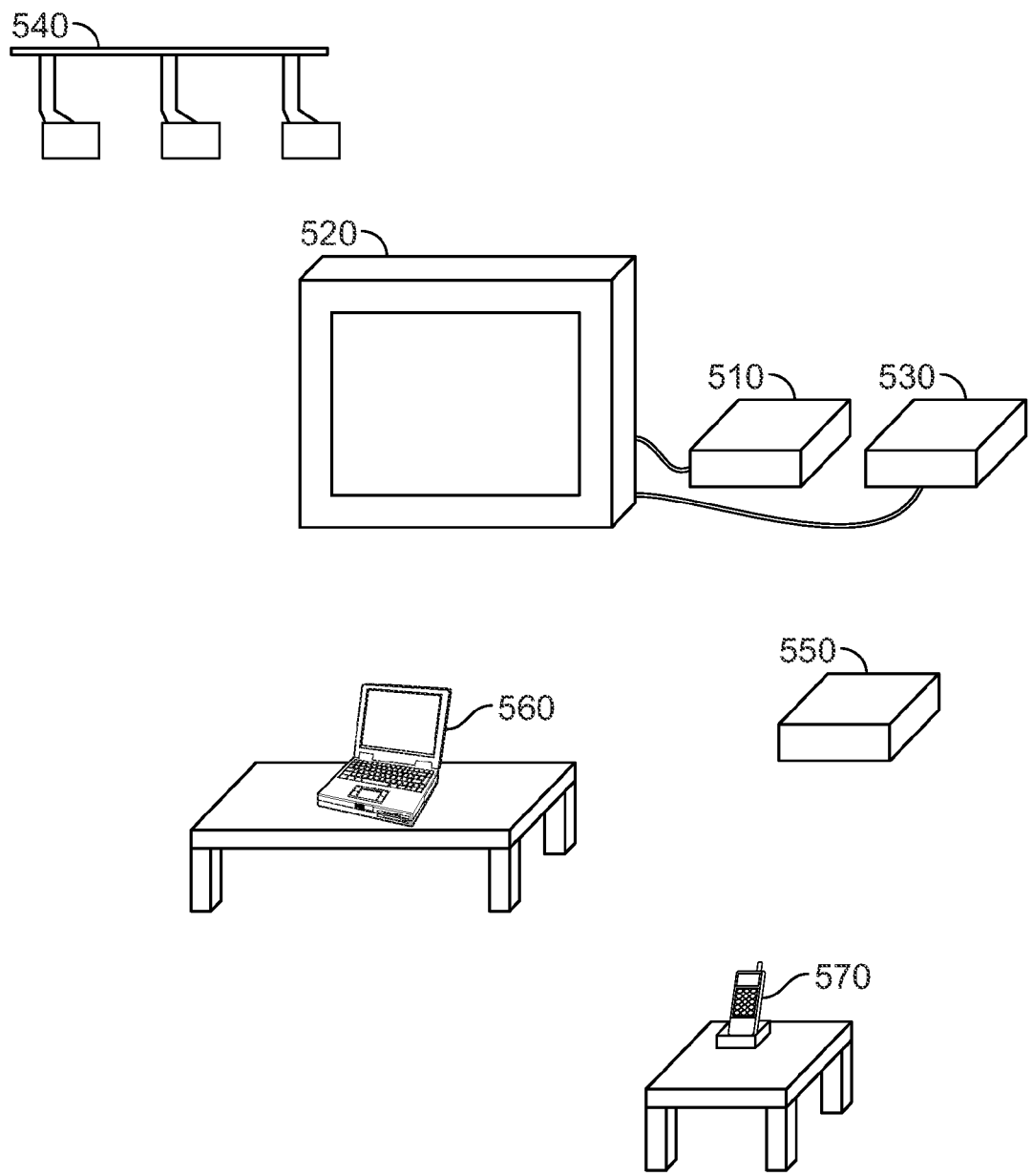
FIG. 5 illustrates examples of user devices that may provide a supplemental content asset in accordance with some embodiments of the present disclosure.

FIG. 5 illustrates examples of user devices and electronic devices, discussed previously in reference to FIG. 3 and FIG. 4, that may provide primary and supplemental content assets in accordance with some embodiments of the present disclosure. The user devices may include set-top box 510, television equipment 520, stereo device 530, speakers 540, gaming console 550, laptop computer 560, personal digital assistant (PDA) 570, or any other suitable user devices or equipment. In some embodiments, a user device may act as a media center that stores content for access. For example, a laptop computer may include a library of content files stored in an internal hard drive.

Additional media files may be stored into the laptop computer. Content files may be played back on the laptop computer, or accessed from the laptop by another user device for play back on the other user device. In some embodiments, a primary user device may access content from a secondary device. For example, a television may display content that is streamed from a set-top box.

Any combination of these devices may be used in a system that provides a supplemental content asset. For example, a system may include a gaming console, a television and a stereo. A user may play a video game on a gaming console that may be displayed on the television, and may be supplemented by the stereo. In response to accessing the video game, the gaming console may transmit information to the stereo about the accessed video game. The stereo may search a local content library on the stereo for a music file that is relevant to the video game and play back the relevant music file to accompany the video game during game play by the user.

A primary user device may be any user device, as described above in reference to FIG. 4 and FIG. 5, that accesses a content asset that may be supplemented by a supplemental content asset accessed by another user device. A secondary device may be any electronic device, as described above in reference to FIG. 4 and FIG. 5, that accesses a supplemental content asset to supplement a primary content asset accessed from a primary user device. For example, a user may access a primary content asset from a primary user device. In response to accessing the primary content asset, the primary user device and a secondary device may communicate to determine what supplemental content asset to provide at the secondary device to supplement the primary content asset. In some embodiments, a secondary device may be an electronic device that does not have a user input. For example, a media center may be accessible through network connections, but not directly through a keyboard or mouse.

In some embodiments, a user device may operate as a primary user device or a secondary device, depending on usage. For example, a gaming console may act as a primary user device when a user is playing a video game that is to be supplemented by a supplemental content asset, or as a secondary device when the gaming console may be used as a media center to provide a supplemental content asset to another primary user device. As an example, a laptop may act as a primary user device when used to play back music videos, or may act as a secondary device to play a music track as a supplemental content asset to a video game being played on a primary gaming console device. As an example, a PDA may act as a primary user device when a user accesses music or videos on the PDA, or may act as a secondary device when providing web sites as a supplemental content asset to a documentary video being watched on a primary laptop computer.

In some embodiments, a primary user device may communicate with a single secondary device, herein referred to as a nexus, that coordinates functions of one or more secondary devices to provide a supplemental content asset. The nexus device may improve efficiency of a primary user device when multiple secondary devices provide a supplemental content asset. By communicating with a nexus device, the number of operations performed on a primary user device may be reduced. For example, instead of communicating with five secondary devices with each providing a supplemental content asset, a primary user device may instead communicate with the secondary nexus device, which communicates with the five secondary devices.

For example, set-top box 510 may act as a secondary nexus device that communicates with secondary television equipment 520 and secondary stereo equipment 530 to present a supplemental content asset to supplement a primary content asset accessed at a primary user device, such as a laptop computer 560. When used to access a video game, laptop computer 560 may transmit information about the accessed video game to set-top box 510. In response to receiving the information about the accessed video game, set-top box 510 may communicate with stereo device 530 to search for a music file, such as a soundtrack, that is relevant to the accessed video game to play as supplemental content asset. Set-top box 510 may also communicate with television equipment 520, in addition to stereo 530, to search for a video file or slideshow from an internal media server of the television equipment 520 that is relevant to the accessed video game to display on the television equipment 520 as a supplemental content asset. The set-top box 510 may communicate information about the video game received from the laptop computer 560 to the television equipment 520 and the stereo equipment 530 to facilitate the search for relevant content. Set-top box 510 may also communicate with a remote server (not shown) to search for an advertisement relevant to the accessed video game to display on television 520 as a supplemental content asset to the video game accessed on laptop 560.

In some embodiments, a primary user device may communicate independently with several secondary devices, instead of through a secondary nexus device. For example, television equipment 520 and stereo equipment 530 may act as secondary devices to a laptop computer 560 that may act as a primary user device. In response to receiving a user input to access a video game, laptop computer 560 may communicate directly with television equipment 520 and stereo equipment 530, instead of through set-top box 510, to provide a supplemental content asset to the accessed video game. The laptop computer 560 may transmit information about the video game to television equipment 520 and stereo equipment 530. In response to receiving the information, television equipment 520 may search an internal local media server for a video file that is relevant to the video game accessed by the laptop computer. In response to receiving the information about the video game, stereo equipment 530 may search a content library on the stereo for a song related to the video game. Television equipment 520 may provide the relevant video file and stereo equipment 530 may provide the relevant song as a supplemental content asset. Television equipment 520 and stereo equipment 530 are able to provide supplemental content asset without a secondary nexus device such as set-top box 510.

In some embodiments, presentation of supplemental content may be performed in response to detection of a primary user device that has played back a portion of a primary content asset within a proximity of the secondary device, or is in the process of playing back a primary content asset. For example, a user may walk near a secondary device with a primary device. If the primary device has played back a primary content asset, the processing circuitry 306 of the primary device may transmit playback information that includes a status that indicates the primary content asset is paused, and the elapsed playback time of the primary content asset. Detecting circuitry 307 of a secondary device may detect the primary device and processing circuitry 306 of the secondary device may receive playback information from the primary device. Processing circuitry 306 of the secondary device may offset the starting time of the supplemental content. When playback of the primary content asset on the primary device is resumed, the processing circuitry 306 of the secondary device may playback the supplemental content asset from the offset starting time to match the primary content asset. If the primary device is currently playing back the primary content asset, processing circuitry of the secondary device may offset the starting time of the supplemental content asset and start playback immediately. Processing circuitry of the primary device may transmit playback information that indicates that the status is playing, and an elapsed time of playback up to the transmission of the playback information. Processing circuitry of the secondary device may offset the starting time of the supplemental content asset and start playback of the supplemental content asset immediately to match the playback of the primary content asset on the primary device.

Figure 6:
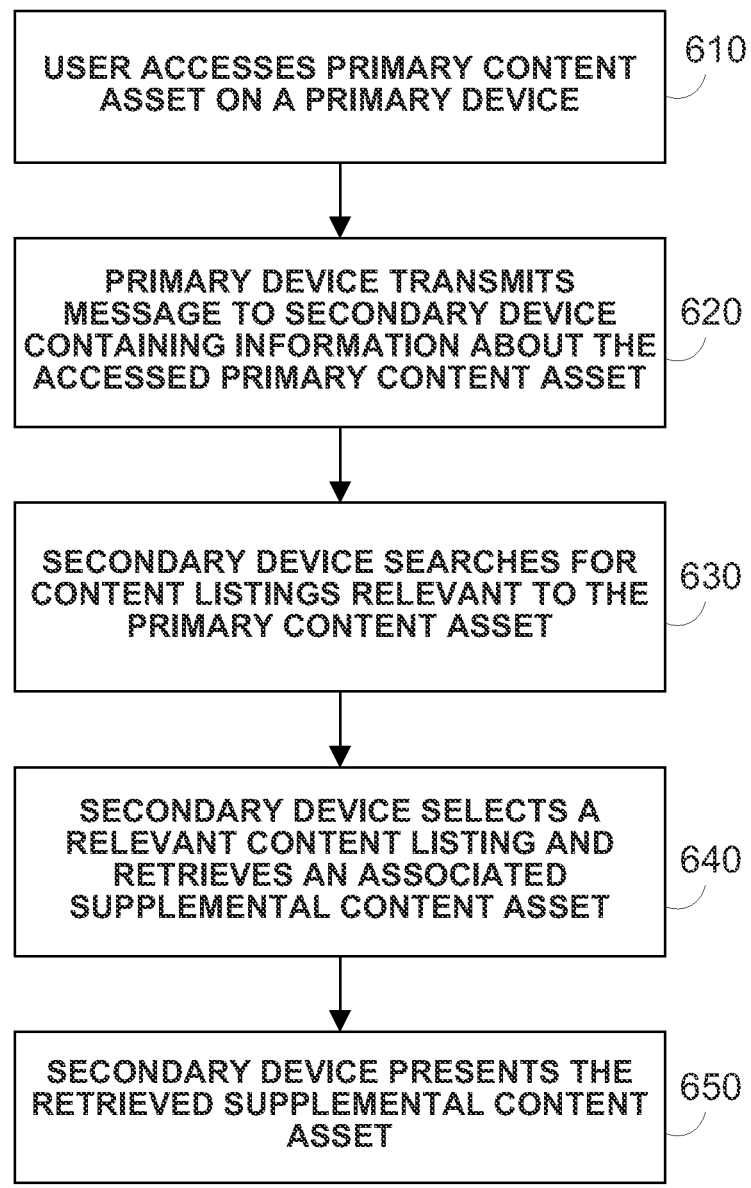
FIG. 6 illustrates a flowchart of steps for providing to a primary content asset accessed on a primary user device, a supplemental content asset accessed on a secondary device in accordance with some embodiments of the present disclosure.

FIG. 6 illustrates a flowchart of steps that describes a process for supplementing a primary content asset accessed on a user device in accordance with some embodiments of the present disclosure. At step 610, a user accesses content using a primary user device. For example, a user may play a video game on a gaming console device 550. In response to accessing the video game, the gaming console device 550 may generate a content information message for transmission to a stereo 530 or other suitable secondary device. The generated message may contain information about the accessed video game that is used by the stereo 530 or other secondary device to search for relevant content. The format and content of the message is described in further detail in reference to FIG. 15.

For example, processing circuitry 306 of the primary user device may receive a user input from a user input interface 310 to access a content asset, such as the video game. In response to receiving the user input, processing circuitry 306 of the primary user device may generate a message containing information about the accessed primary content asset.

At step 620, the primary user device transmits the message to a secondary device. For example, the gaming console, or another primary user device, may transmit a message to the stereo, or another secondary device, that contains information about the video game such as genre or title. In this example, the genre of video game may be classified as action. The stereo may receive and process the message to extract information about the video game. For example, at the primary user device, processing circuitry may communicate the message on an I/O path, across communications network 414 to the secondary device. At the secondary device, processing circuitry may receive the message from an I/O path. Processing circuitry of the secondary device may extract information from the message about the primary content asset accessed at the primary user device. The processing circuitry and I/O paths of the primary and secondary devices may be substantially similar to the processing circuitry 306 and I/O path 302 shown in FIG. 3.

At step 630, the secondary device searches a database for a supplemental content asset that is relevant to the primary content asset, based on the information about the primary content asset. In some embodiments, the database may include content listings, where each content listing is associated with a content file stored in a library of content files. For example, as described above in reference to FIG. 3, storage 308 of a secondary device may store a library of content files and a database of content listings. Each content listing may be associated with a content asset file of the stored library or a content asset accessible to the secondary device, such as web content asset. In some embodiments, the database may include content files. For example, storage 308 of a secondary device may store a database of content files. Relevancy of the potential supplemental content asset may be determined by comparing metadata, feature information, mood information and/or any other suitable information of the primary content asset and corresponding information of potential supplemental content assets in the database. For example, a stereo acting as a secondary device may search for audio files that are relevant, based on title or genre, to a video game being played on a gaming console acting as a primary user device. The stereo 530 may search for stored content that is relevant to the video game, by using information extracted from the transmitted message. If the video game is classified as the action genre, the stereo may search for audio files from an internal database that are relevant to the action genre and return results that include soundtracks from action movies and action television shows.

In some embodiments, the secondary device may search for relevant content based on features extracted from the primary content asset. For example, if the primary content asset is a video file, the stereo may search for relevant content by video features or image features. For example, the color palette of the video may be extracted. Processing circuitry 306 of a secondary device may store a lookup table in storage 308 that correlates different schemes of the color palette with metadata terms. For example, processing circuitry 306 may store an entry in the lookup table that correlates grayscale color palettes to music from the 1950s time era. If the secondary device is a stereo, processing circuitry 306 may determine that the color palette of the primary video content is grayscale, and in response search the lookup table and return the metadata terms for "1950s music." Processing circuitry 306 of the stereo may then search for music files with metadata associated with the 1950s time era when black and white televisions were used. Relevancy metrics will be further discussed later in the specification in reference to FIG. 8.

In some embodiments, the relevant content may be accessed from a local storage on the secondary device. For example, at the secondary device, processing circuitry 306 may access storage 308 to search for content that is relevant to the primary content asset accessed on the primary user device.

In some embodiments, the relevant content may be accessed from a remote storage. For example, at a secondary device, processing circuitry 306 may transmit a command along I/O path 302 through communications network 414 to content source 416 and media guidance data source 418 to search for content that is relevant to the primary content asset accessed on the primary user device. The search methods will be described in further detail in reference to FIG. 8. In some embodiments, the results of the search for relevant content may be accessed from a combination of local storage and remote storage.

At step 640, the secondary device selects a relevant supplemental content asset to access based on the search results that were determined in step 630. For example, the processing circuitry 306 of the stereo, or another secondary device, may select an action movie sound track from the search results including sound tracks. In some embodiments, processing circuitry 306 of a secondary device may select a content asset with the highest relevancy metric from among the relevant content determined in step 630 as a supplemental content asset.

At step 650, the secondary device presents the relevant content on a secondary device as a supplemental content asset to the primary content asset. For example, the stereo 530 may play back the action movie soundtrack selected in step 640, to accompany the video game during game play by the user. For example, at a secondary device, processing circuitry 306 may output the selected relevant content to display device 312 and speakers 314. In some embodiments, the relevant content may contain only a video component and no audio component. In such cases, processing circuitry 306 may output the video content to display 312. In some embodiments, the relevant content may only contain an audio or music component, and no video component. Processing circuitry 306 may output the audio or music component to speakers 314.

In some embodiments, the secondary device may present the relevant supplemental content asset on the same secondary device. As an example, the secondary device may be stereo 530. Steps 620, 630, 640, and 650 could be performed by the secondary stereo 530, communicating directly with a primary gaming console. In some embodiments, the secondary device may present the relevant content on a different secondary device, for example when a nexus secondary device communicates with another secondary device. In some embodiments, a secondary device that provides commands to present content may be a master secondary device, and a secondary device that receives the commands and presents the content may be a slave secondary device. For example, a system may include a gaming console, set-top box, and a stereo. The gaming console may act as a primary user device. A user may access an action video game at the gaming console.

In response, the gaming console may transmit a generated message to the set-top box, containing information about the accessed video game. The set-top box may then process the received message to extract information about the accessed primary content asset, and select a relevant content, such as an audio soundtrack, based on the extracted information. Once the set-top box has selected a content asset, it may direct a stereo to playback the selected audio soundtrack. A series of actions may be performed by the secondary device, during an event of presenting the supplemental content asset. For example, at secondary set-top box 510, processing circuitry 306 may access a file corresponding to an action movie soundtrack that is relevant to the primary content asset, the action video game. The set-top box may then transmit the relevant soundtrack and a playback command along I/O path 302 across communications network 414 to another secondary device such as stereo 530. At secondary stereo 530, processing circuitry 306 may receive the relevant content and play back command from I/O path 302 and play back the received content.

Figure 7:
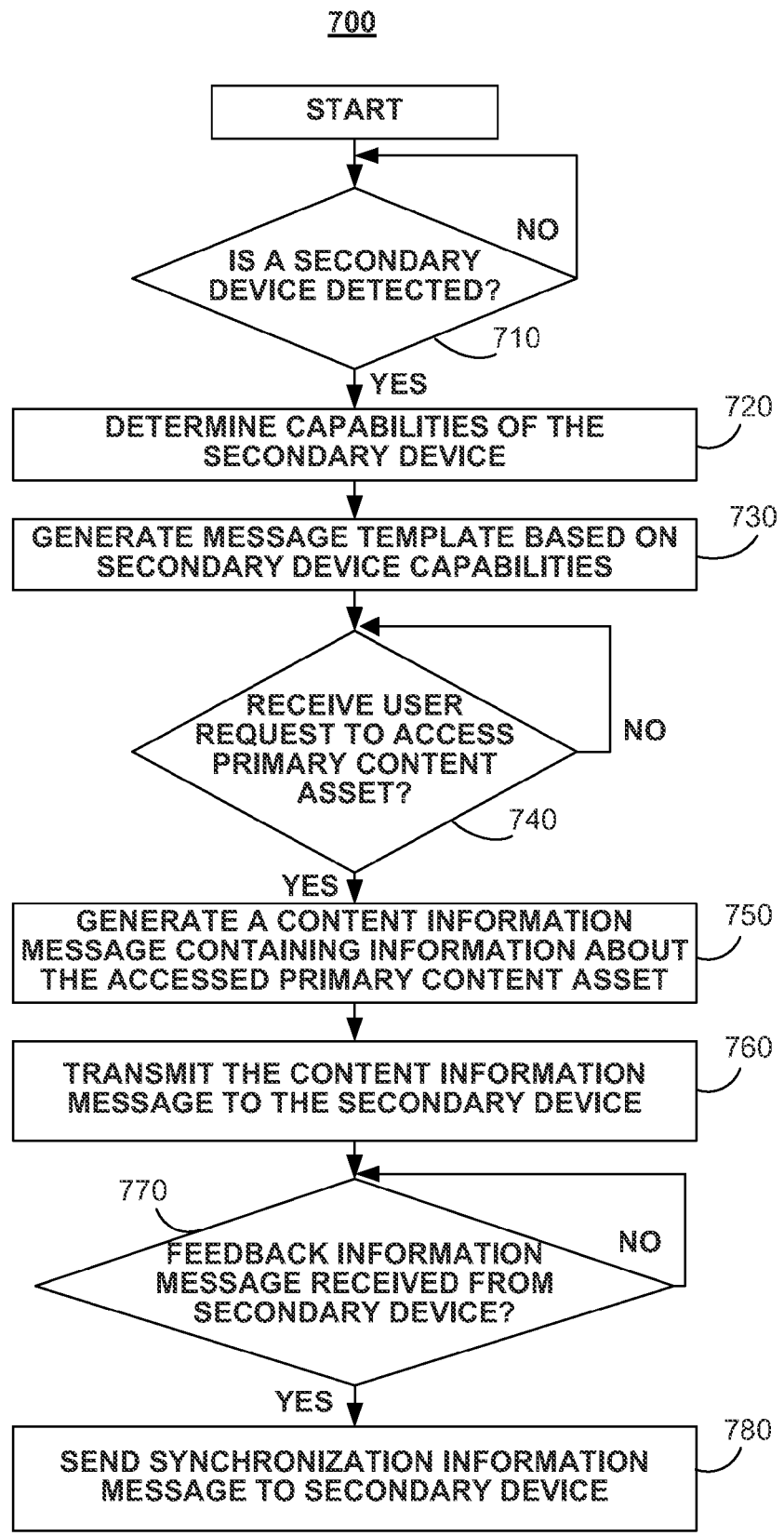
FIG. 7 illustrates a flowchart of steps, performed by a primary user device, that describes a process for providing a supplemental content asset from a secondary device to a primary content asset accessed on a primary user device in accordance with some embodiments of the present disclosure.

FIG. 7 illustrates a flowchart of steps that describes a process for supplementing a primary content asset accessed on a primary user device in accordance with some embodiments of the disclosure. The process illustrated by FIG. 7 may be carried out on a user device that is acting as a primary user device or a secondary device. For example, a portable gaming device with wireless capabilities may scan for surrounding secondary devices that may provide a supplemental content asset. Depending on the type of secondary devices detected, the portable gaming device may generate a message template. The portable gaming device may use the message template to generate content information messages that include information about a primary content asset accessed by the portable gaming device, and type of supplemental content asset that is to be provided by the secondary devices. For example, if only audio devices such as stereos are detected, the message template may indicate that only audio content should be presented. The message template may also be generated based on input from a user of the primary user device. For example, in response to a user input indication that a supplemental video content asset is desired, processing circuitry of a user device may generate a message template that indicates supplemental video content assets are to be searched and provided by the detected secondary devices. In response to a user indication that a supplemental audio content asset is desired, a message template may be generated that indicates a supplemental audio content asset is desired. In some implementations, the user may specify that only one type of supplemental content asset is desired. For example, in response to a user input indication that only supplemental video content are desired, processing circuitry of a primary user device may generate a message template that indicates only supplemental video content are to be searched and provided by the detected secondary devices. The supplemental content asset type preference indicated in the message template may reduce the time used by processing circuitry of a secondary device to search for a supplemental content asset.

After detecting secondary devices and generating a message template, the portable gaming device may select one or more secondary devices to provide a supplemental content asset. As an example, the portable gaming device may select a stereo 530 as a secondary device. The portable gaming device may generate and transmit a content information message to the stereo device. The portable gaming device may then poll for a feedback information message from stereo 530 that indicates whether a relevant supplemental content asset has been found. In some embodiments, the feedback information message may also include a timestamp and timeline with markers to coordinate presentation of the primary content asset and supplemental content asset.

In response to receiving the feedback information message, the portable gaming device may generate a synchronization information message to transmit to the stereo device. The synchronization information message may serve as an acknowledgment by the portable gaming device, and provide a timestamp and timeline to the stereo device to coordinate presentation of the primary content asset and the supplemental content asset.

As an example, a timeline received in the feedback information message from the stereo device may contain markers that correspond to a playlist of relevant supplemental content assets on the stereo device. A timeline sent in a synchronization information message from the portable gaming device to the stereo device may include adjustments to the marker positions received in the feedback information message to indicate when the stereo should play back certain songs, to coordinate with game play of a video game on the portable gaming device.

Steps 710, 720, and 730 can be considered as a set-up phase of the process for the primary user device. A set of steps corresponding to a similar set-up phase will be discussed in reference to FIG. 8. Steps 710, 720, and 730 may be performed at any suitable time. For example, before a primary user device and a secondary device communicate information about a primary content asset that is accessed on the primary user device. In some embodiments, the steps may be performed before a primary content asset is accessed at a primary user device.

For example, a gaming console may first detect available secondary devices that are physically connected by cables or within a range of wireless communication. Executing the steps of a set-up phase before a primary user device accesses a primary content asset and before a secondary device accesses supplemental content asset allows the primary user device and secondary device to perform initialization operations that may require significant overhead in run time. Running the set-up steps may reduce the time needed to provide a supplemental content asset at a later time because of the elimination of the initial overhead run time.

Initialization operations may be operations performed at least once upon power-up of a user device, or connection of a user device to another user device, that may be included in the initial overhead. In some embodiments, the steps may be performed upon power-up of the possible primary user device. In some embodiments, the steps may be performed periodically as new secondary devices may enter the system. Initialization operations may include indexing stored content to enable fast searching and access.

At step 710, a primary user device determines if any possible secondary devices have been detected in the surrounding vicinity. For example, a wireless portable gaming device may scan for secondary wireless devices in the vicinity. A portable gaming device may also detect secondary devices that are physically connected, for example, by a USB cable. In some embodiments, the primary user device may initiate a scan for secondary devices by actively transmitting a message to secondary devices. For example, at a primary user device, processing circuitry 306 may transmit messages on I/O path 302 across communications network 414 to a secondary device. In some implementations, the secondary device and primary user device may communicate across a wireless network. For example, the transmitted message may be a beacon broadcast to all active secondary devices. The transmitted message may also be a probe request directed toward a secondary device.

In some embodiments, the primary user device may passively scan for messages from secondary devices. For example, at the primary user device, processing circuitry 306 may receive beacon or probe request messages from I/O path 302. If a secondary device is detected, the process proceeds to step 720, otherwise the process repeats at step 710. In some embodiments, wireless detection techniques as described in reference to FIG. 4 are used to detect secondary devices.

At step 720, the primary user device has detected at least one secondary device by receiving from the secondary device a message, such as a beacon or probe response. The primary user device receives an information message from a secondary device, and determines information about the detected secondary device. In some implementations, the device information message may be received as part of the detecting step 710. In some implementations, the device information message may be received after the detecting step 710. For example, a portable gaming device may have received beacon messages from secondary devices in the surrounding area, and may process the beacon messages to extract information about the secondary devices in the surrounding area. The device information message may contain capabilities information such as the type of content that the secondary device is able to present (e.g., audio, video, Internet content, multimedia etc.), type of information such as whether the secondary device is a nexus, whether the secondary device contains a content library of stored files, history information such as whether the secondary device has previously provided a supplemental content asset to the primary user device, or any other suitable information related to the providing of a supplemental content asset.

Processing circuitry of the primary user device may extract information about the capabilities of the secondary device from a device information message received from the secondary device. As a result of processing received device information messages, the primary user device may determine that there is a secondary stereo 530, a secondary television 520 and a secondary set-top box 510. The primary user device may determine that the secondary stereo 530 has a library of digital music files, and that the secondary set-top box 510 has a library of digital video files and Internet content. For example, at the primary user device, processing circuitry 306 may receive from I/O path 302 a device information message transmitted from a secondary device. Processing circuitry 306 may then extract information about the secondary device from the received device information message and store information about the secondary device in storage 308.

In some embodiments, the primary user device may determine which detected secondary device may be used to provide a supplemental content asset based on the capabilities information. For example, processing circuitry 306 of the primary user device may receive user input from a configuration screen 1100 of FIG. 11, indicating what type of content should be provided as a supplemental content asset. Processing circuitry 306 may store configuration information indicating the type of supplemental content asset that should be provided. Processing circuitry 306 may select a secondary device to provide a supplemental content asset based on the capabilities of the secondary device and the stored configuration information.

At step 730, based on information about detected secondary devices determined from step 720, the primary user device generates a message template that is used to communicate information about a primary content asset that is accessed on the primary user device, and information about a requested type of supplemental content asset. This message template may be used by a secondary device to select content that is relevant to the primary content asset. For example, the primary user device determines that only a secondary stereo device 530 is available, it may generate a message template that contains acoustic feature information, but not visual feature information. The selective inclusion of information reduces the size of the message that may be communicated between a primary and secondary device. The smaller message size reduces the communication time of the content information message.

As an example, processing circuitry 306 may access information about detected secondary devices from storage 308. If processing circuitry 306 determines from the information that only a secondary stereo device has been detected, it may generate a message template that includes fields for metadata information, and fields for acoustic feature information about a content asset. If processing circuitry 306 determines that a secondary television device has been detected, it may generate a message template that includes fields for metadata information about a content asset, fields for acoustic feature information about the audio component of a content asset, and visual feature information about the video component of a content asset. In some embodiments, a message template may be generated for each type of secondary device that is detected. For example, if a stereo and television are detected, a first message template may be generated for the stereo and a second message template may be generated for the television. Processing circuitry 306 may store a generated message template in storage 308.

In some embodiments, processing circuitry 306 of the primary user device may generate the message template in part based on user profile information stored on the primary user device. For example, a user of the primary user device may specify a preference for audio instead of video as a supplemental content asset from a secondary device. User profile information may resolve conflicts when selecting the type of supplemental content asset. For example, processing circuitry of a primary laptop computer may detect a secondary television equipment 520 and a secondary stereo equipment 530. If the user profile indicates a preference for video as a supplemental content asset, processing circuitry of the primary laptop computer may generate a message template that includes fields for metadata that indicate only video content should be searched on a secondary device and fields for visual feature information that may be used to determine relevancy of a video. Step 730 may be considered the last step of the set-up phase.

At step 740, the primary user device determines whether a user has requested to access a primary content asset on the primary user device. For example, a gaming console may determine whether a user has tried to play a video game. Processing circuitry 306 may receive a user input from user input interface 310 indicating a desire to play a video game. If the processing circuitry of the primary user device receives a user request to access a primary content asset, it proceeds to step 750. Otherwise, the primary user device will loop on step 740.

At step 750, the primary user device generates a content information message containing information about the requested a primary content asset from step 740. The content information message may be generated using the message template created in step 730. For example, in response to receiving a user indication to play a game, a gaming console may access the video game and extract information to generate a content information message which includes metadata information such as title and genre, and acoustic feature information from the soundtracks of the video games. In some embodiments, the feature information may be generated from a specific scene or segment of the video game that is being accessed. For example, the acoustic feature information may be extracted from a soundtrack of a level of the video game that is selected for game play. Processing circuitry 306 may access storage 308 to retrieve the generated message template and the requested content. Processing circuitry 306 may then generate a message based on the message template and the requested content.

At step 760, the primary user device transmits a content information message generated in step 750 to the secondary device. For example, a gaming console may transmit a generated content information message to a stereo, set-top box, television, or other suitable secondary device. Processing circuitry 306 of the primary user device may transmit the generated information message on I/O path 302 across communications network 414 to a secondary device.

At step 770, processing circuitry of the primary user device determines whether a feedback information message has been received from the secondary device. Feedback information may be used to coordinate the presentation of a supplemental content asset with the presentation of a primary content asset accessed on the primary user device. For example, when a user plays a video game, it may be desirable to play back a supplemental soundtrack from a secondary stereo that is synchronized with the playback of the video scenes from the primary video game.

In some embodiments, the feedback information message may include a simple indicator of whether the secondary device was successful or unsuccessful in finding a relevant supplemental content asset. In some embodiments, the feedback information message may contain information to coordinate playback of the supplemental content asset and primary content asset. For example, a feedback information message from a secondary stereo may include a timestamp and timeline. The timestamp may indicate to the primary user device when to start playing the primary content asset. The secondary device may also play back content starting at the same timestamp. The timeline may include markers to indicate to the primary user device when the supplemental content asset may end. At these markers, the primary user device may pause playback of the primary content asset, or may send another media information message to the secondary device to request selection of a new supplemental content asset. For example, processing circuitry 306 of a primary user device may receive a feedback information message from a secondary device across communications network 414 on I/O path 302. If the primary user device receives feedback information from the secondary device, the process proceeds to step 780. Otherwise, the process loops on step 770.

At step 780, in response to receiving the feedback information message from the secondary device, the primary user device generates and transmits a synchronization information message to the secondary device. Synchronization information is used to coordinate presentation of the primary content asset accessed on the primary user device with presentation of the supplemental content asset accessed on the secondary device. For example, similar to the description of a feedback information message, a primary user device may transmit timeline and timestamp information to the secondary device to signal when playback of the supplemental content asset should occur. At a primary user device, processing circuitry 306 may generate and transmit a synchronization information message on I/O path 302 across communications network 414 to a secondary device. At a secondary device, processing circuitry 306 may receive a synchronization information message on I/O path 302 from communications network 414. Processing circuitry 306 may process the received message to extract a timestamp and timeline including markers. Processing circuitry 306 then presents a supplemental content asset on display 312 and speakers 314 as a function of the time extracted from the timestamp.

Figure 8:
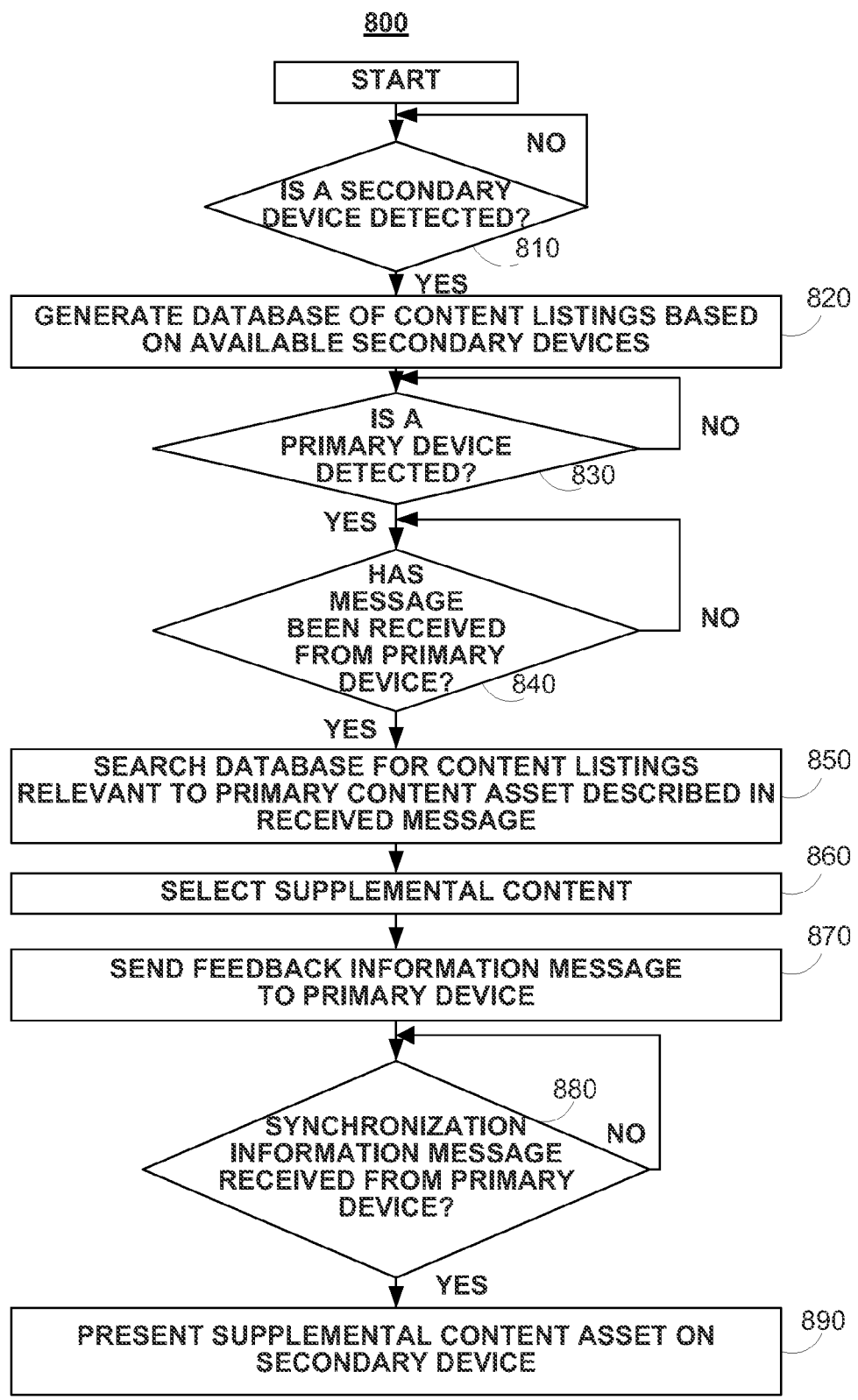
FIG. 8 illustrates a flowchart of steps, performed by a secondary device, that describes a process for providing a supplemental content asset from a secondary device to a primary content asset accessed on a primary user device in accordance with some embodiments of the present disclosure.

FIG. 8 illustrates a flowchart of steps that describes a process for supplementing content by a possible secondary device in accordance with some embodiments of the present disclosure. For example, a secondary device such as a stereo may provide soundtracks as a supplemental content asset to a video game that is being played on a gaming console.

Steps 810 and 820 can be considered as a set-up phase of the process for the secondary device. During this phase, the secondary device may generate a database of content or content listings that can be searched to find a supplemental content asset relevant to a primary content asset. For example, processing circuitry of a stereo may generate a database of content or content listings for each music file stored within a local media server within the stereo. If the secondary device acts as a nexus device, it may detect other secondary devices during this phase. For example, a system of secondary devices may include a set-top box, a DVD player and a stereo. The set-top box may act as a nexus device to coordinate the operation of the DVD player and stereo. If the set-top box acts as nexus, the set-top box first detects other secondary devices such as the DVD player and the stereo. The devices may be connected by physical connections such as USB cables, Ethernet cables or any other suitable cables. The devices may be connected by wireless connections, as described previously in reference to FIG. 3 and FIG. 4.

In some embodiments, several secondary devices independently communicate with a primary user device without the use of a secondary nexus device as an intermediary. In these embodiments, the secondary device may include a local content source and a local media guidance data source. Processing circuitry 306 of the secondary device may generate a database of its stored content, using similar concepts as described below in reference to the embodiments employing a secondary nexus device.

In some embodiments, a nexus device is used, and the other detected secondary devices may collectively appear as a single secondary device to the primary user device. In some implementations, the secondary nexus device may act as a router that does not store any content and provides a supplemental content asset for a primary user device by coordinating with other secondary devices. In some implementations, the secondary nexus device may be capable of providing a supplemental content asset for a primary user device without coordinating with other secondary devices. In these implementations, the secondary nexus may internally store content libraries, or access content libraries stored on a remote server, or on the Internet.

At step 810, the secondary device detects if there are any other secondary devices available. For example, the secondary device may be a nexus device, and may detect other secondary devices through physical connections or through wireless network connections as described in reference to FIG. 4. For example at the secondary nexus device, processing circuitry 306 may receive a device information message at I/O path 302 from a secondary device indicating capabilities and one or more content libraries. This message may be similar to the messages received by a primary user device, such as a beacon or probe response, when scanning for secondary devices as described in reference to step 710 of FIG. 7. In some implementations, this message may be a device information message, a content information message, any other suitable message or any combination thereof.

At step 820, processing circuitry of a secondary device generates a database of content or content listings based on the available content libraries. For example, a system may include a set-top box that acts as a nexus, a DVD player and a stereo. A database generated by such a system may include content or a content listing for the content that is stored on the stereo, stored in the discs loaded in the DVD player, or may be available to the set-top box from a remote content source 416. The database listings for content may include metadata from the content file, and acoustic and visual feature information extracted from the content and timing information as described previously. In some implementations, the metadata may include timing information, acoustic feature information, and/or visual feature information. In some embodiments, the secondary nexus device communicates with other slave secondary devices to build an aggregate database of content listings that may be used to select a relevant supplemental content asset. For example, at a slave secondary device, processing circuitry may transmit a message on an I/O path across communications network 414 to the secondary nexus device providing information about its content library. At the secondary nexus device, processing circuitry may receive a message on an I/O path containing information about the content library of the slave secondary device. The processing circuitry of the nexus device may then compile information about the content libraries of other slave secondary devices. The processing circuitry and I/O paths of the slave secondary devices and secondary nexus devices may be substantially similar to processing circuitry 306 and I/O path 302 of the device illustrated in FIG. 3.

To assist in the searching for relevant content and correlation of content files, features may be extracted by analysis of content files. For example, acoustic features may be extracted from audio files that serve as metrics for measuring bass, treble, rhythm, pitch distribution or any other suitable acoustic characteristics. Examples of acoustic features include mel-frequency cepstral coefficients (MFCCs), cepstral coefficients, formants and frequency. As an example, a user may access an audio file that has a large bass component. This may be observed by a large weighting of a low frequency coefficient extracted from a Fourier spectrum of an audio file. The relevancy of content may be determined by comparing these acoustic features. Similarly, visual features including brightness, contrast, color range, edge count, corner count, or any other suitable visual feature may be extracted from image files and video files. As with acoustic features, the relevancy of content may be determined by comparing visual features.

In some embodiments, steps 810 and 820 may be skipped. For example, if a secondary device is not a nexus device, it may not detect other secondary devices.

At step 830, the secondary device detects if a primary user device is available. For example, detecting circuitry 307 may use wireless detection techniques to actively or passively scan for a primary user device. In an active scan, detecting circuitry 307 may broadcast probe messages on I/O path 302 to query the presence of other wireless primary user devices. If there is a wireless primary user device present, detecting circuitry 307 of the secondary device may receive probe response messages from I/O path 302 identifying the primary user device. In a passive scan, detecting circuitry 307 may poll for beacon messages broadcast by a primary user device that identifies the primary user device.

In some embodiments, the probe response or beacon messages received from the primary user device may include playback information that describes a primary content asset that may be playing on the primary user device. Processing circuitry 306 of the secondary device may extract playback information for later use in the presentation of supplemental content. If a primary device is detected, the process proceeds to step 840, otherwise the process loops on step 830.

At step 840, the secondary device polls for a content information message from a primary user device that provides information about a primary content asset that has been accessed on the primary user device. For example, a secondary stereo may poll for a content information message from a gaming console that provides information on a video game being played. The content information message may be used to search for a supplemental content asset from the stereo to supplement the video game. At the secondary device, processing circuitry 306 may receive the information message from I/O path 302. In response to receiving the message, processing circuitry 306 may extract relevant information from the content information message. In some embodiments, the content information message may include playback information as described above. For example, the playback information described above may be included in the content information message instead of the beacon or probe response messages.

In some embodiments, steps 830 and 840 may be combined into one step. For example, instead of two steps of receiving a probe response or beacon frames, and receiving a content information message, processing circuitry 306 of a secondary device may receive a content information message that indicates the presence of a primary user device. The playback information may be included in the content information message. The use of separate steps for 830 and 840, or a combined step for 830 and 840, may depend on design considerations. For example, beacon, probe and probe response messages may be short communications that require minimum bandwidth for transmission, while content information messages may be large communications that require longer transmission time. By using constant transmission and reception of small beacon, probe and probe response messages to determine presence of a primary device, instead of constant transmission and reception of large content information messages, bandwidth in the air may be more efficiently allocated. Alternatively, periodically transmitting a content information message over the air may reduce programming complexity.

If the content information message has been received from the primary user device, the process will proceed to step 850. Otherwise the process will loop at step 840.

At step 850, processing circuitry of the secondary device receiving the content information message from the primary user device searches a database compiled above in step 820 for possible supplemental content assets that is relevant to the primary content asset accessed on the primary user device. For example, a secondary stereo may search a content library of sounds for audio soundtracks to play back as accompaniment to a video game being accessed on a primary gaming console. Relevancy of content may be determined using information processed from the content information message in step 840. For example, metadata, acoustic features, or visual features may be compared and correlated. Comparing similar or identical content types may be straightforward as many commonly shared fields may exist in the metadata and acoustic and visual features. For example, a genre and keywords from titles contained in the metadata may be compared to determine relevancy of two mp3 audio files. For example, extracted frequency coefficient features may be compared to determine relevancy of two mp3 audio files.

To determine relevancy of two files having different file types, algorithms may be used to determine how to compare the different file types. For example, the metadata fields of the two different files may be compared to determine common fields that may be used for comparison. The acoustic and visual features of the two different files may be compared to determine common fields that may be used for comparison.

In some embodiments, pre-set algorithms may be used to compare different file types to determine relevancy. In some embodiments, algorithms may adaptively learn to correlate and categorize different file types based on user access. As an example, processing circuitry 306 may extract metadata and feature information from the message received in step 840 and search a database of content assets and content listings stored in storage 308. Processing circuitry 306 may compute a relevancy metric between the content assets and content listings of the database and the primary content asset accessed on the primary user device. The metric may be a weighted average of several comparison metrics calculated by comparing metadata and features between the two files. The comparison metrics may include Euclidean distance or ratios of metadata and features.

In some embodiments, files of different media types may be correlated and compared. For example, processing circuitry of a secondary device may search for relevant music to supplement a video that does not have a soundtrack. If there are no common acoustic or visual features between the two different file types, different types of features may be correlated. For example, music having a high bass component and slow rhythm is typically associated with melancholy emotions. Similarly, images having dark or gray color backgrounds are typically associated with melancholy emotions. To correlate the audio file and video file, a feature vector of frequency coefficients of the audio file may be compared against a feature vector of color indices of the video file. A feature vector may be a single or multi-dimensional array of numerical elements corresponding to a specific metric. The feature vector of frequency coefficients may describe the relative proportion of different frequency bands that may occur in an audio file, and may be ordered in a one-dimensional array from low frequency to high frequency. For example, the frequency coefficients may correspond to different portions of a mel-scale of frequency. The feature vector of color indices may describe the relative proportion of different colors that appear in a video. In the examples of frequency and color, a feature vector may be a one-dimensional array of numbers, in which each array element is a number corresponding to a different frequency band or color index.

The feature vectors may be pre-processed before comparison by processing circuitry of a secondary device. For example, if the feature vectors are of different length or dimensionality, processing circuitry 306 of a secondary device may resize the vectors to the same length and dimension by combining numerical elements of the vector. The combination may be done by calculating an arithmetic mean, geometric mean, or any other suitable mathematical combination of the numerical elements. After resizing the feature vectors to similar sizes, the numerical data of the feature vectors may be normalized. For example, each numerical element of the feature vector may be scaled so that the sum of the elements in the vector is equal to one.

Processing circuitry 306 of the secondary device may then analyze the feature vectors using any suitable method of comparison. For example, processing circuitry 306 may calculate a dot product of the feature vectors to produce a result vector. The elements of the result vector, or any combination thereof may be a relevancy metric used to determine whether the video file and audio file are relevant. For example, processing circuitry 306 may compare the elements of the result vector against a threshold value, to determine whether the video file and the audio file are correlated.

The threshold may be defined using any suitable approach. As referred to herein, a "threshold" may be a number or vector of numbers programmed into an electronic device at time of manufacture, entered by a user, or calculated by control circuitry of an electronic device. In some embodiments the threshold value may be varying. For example, control circuitry of an electronic device may calculate the threshold value may as a fraction of a moving average of elements of previously determined result vectors. In some embodiments, the threshold may be calculated based on content assets that are indicated in user preference information as most commonly accessed by a user. Control circuitry may calculate the threshold value as a weighted average of elements of result vectors calculated from comparing features of the most commonly accessed content assets. The threshold may be stored in storage 308, and retrieved by control circuitry 304 for use in comparisons.

At step 860, processing circuitry of a secondary device selects a relevant content for supplementing the primary content asset accessed on the primary user device. For example, a secondary stereo may select a movie soundtrack as a supplemental content asset to accompany an action video game accessed on a primary gaming console. In some embodiments, the secondary device may select from the database the content having the highest relevancy metric. At a secondary device, processing circuitry 306 may select the content from the database having the highest relevancy metric computed in step 850. In some embodiments that use a secondary nexus device, the secondary nexus device may select the most relevant content for each slave secondary device. For example, a system of secondary devices may include a nexus set-top box, a stereo and a DVD player. The set-top box may select two relevant supplemental content assets: an audio file for playback on the stereo, and a DVD track for playback on the DVD player. In some embodiments, the selecting of the relevant content may be performed by the processing circuitry of slave secondary devices instead of the processing circuitry of the secondary nexus device. For example, the selection of the relevant audio file may be performed by processing circuitry of the stereo, and the selection of the relevant DVD track may be performed by the processing circuitry of the DVD player.

For example, at the secondary nexus device, processing circuitry 306 may select a content asset having the highest relevancy metric from the listings corresponding to each slave secondary device. Processing circuitry 306 may then transmit a message on an I/O path 302 across communications network 414 to a slave secondary device indicating which content is to be provided as a supplemental content asset.

In some embodiments, selection of the supplemental content asset by a secondary device may be based in part on user profile information. For example, relevancy of supplemental content asset may be affected by a user's age, gender or mood. User profile information may be used in the search for a relevant supplemental content asset. For example, processing circuitry 306 of a secondary device, such as a stereo, may select a different soundtrack based on whether the user of the primary user device is a male or female. Systems and methods for sharing media using social networks are discussed in greater detail in connection with Ketkar, U.S. patent application Ser. No. 12/848,025, filed Jul. 30, 2010, which is hereby incorporated by reference herein in its entirety.

The user profile information may be stored on a local storage device on a user device, or may be accessed from a remote server using a communication network as described in reference to FIG. 4. In some embodiments, the user profile information may be communicated from a primary user device to a secondary device in a content information message. For example, processing circuitry 306 of a primary user device may transmit user profile information in a content information message to a secondary device. In some embodiments, either a primary user device or secondary device may access the user profile information from a remote server or over the Internet. For example, the user profile information may be stored on a social network, including Facebook™, Twitter™ and MySpace™. In these social networks, users may post current status and moods.

In some embodiments, the mood may be specifically selected by a user. For example, a user device may present a menu of a list of moods to a user. In response to receiving a selection of a mood from the user, processing circuitry 306 of the user device may connect to the user's account on a social network to post the mood information. A user device may then determine the mood of a user by retrieving the posted mood information from the social network. For example, processing circuitry 306 of the user device may then connect to the user's account on a social network to retrieve previously posted mood information.

In some embodiments, mood information may be extracted based on content posted to a social network by a user. For example, a user may post content, such as a video, a link to a video, or text on a social network. Mood information may be extracted from this posted content. In some implementations, the content may have mood information stored in metadata. For example, a music video of a heavy metal genre may have a metadata field indicating that the mood corresponding to the video is angry. The mood metadata may be text, a number, set of numbers, any other suitable metadata or any combination thereof. For example, the mood metadata may be text information that describes a mood, such as "angry", "happy", "sad", or "depressed". The mood may be a number on a scale corresponding to different moods. For example, 1 may indicate happy and 10 may indicate depressed. In such a scale, a number of 5 may indicate a neutral mood.

The mood may be a series of numbers, corresponding to magnitude of different moods. For example, the mood information may include three numbers, each on a scale of 0 to 10, corresponding to three separate mood categories such as happy, angry and depressed. The number on the scale indicates the extent of the mood. For example, a number 0 for the happy category may indicate that a user is not happy, while a number 10 for the happy category may indicate that a user is very happy.

The mood information in the metadata may be assigned when the content file is created, or may be modified at some time after creation of the file. In some implementations, mood information may be pre-processed or determined by a server hosting the social network. For example, processing circuitry of a server may receive and analyze content posted by a user. For example, the processing circuitry may extract the mood metadata information from a series of recently posted content (e.g., the most recent five posts, or any posts within a fixed time period in the past, such as 10 hours). Using the extracted mood information from the posted content, the processing circuitry may calculate a mood of the user by averaging the extracted mood information.

In some implementations, the mood information may be determined by a user device connecting to a social network. For example, processing circuitry 306 of a user device may connect to the user's account on a social network and retrieve the mood metadata information corresponding to content posted by the user.

In some implementations, a user device or server hosting the social network may determine mood information based on the content. For example, processing circuitry of the user device or the server may analyze keywords in the text of a message that is posted to the social network, or to be posted to the social network and determine a mood.

In some embodiments, a user device may post mood information to a user's account on a social network, based on mood information determined from primary content asset accessed by a user. For example, in response to receiving a user request to access a primary content asset associated with an angry mood, such as a heavy metal album, processing circuitry 306 of a primary user device may send an update to a server hosting a social network account of the user, indicating that the user is angry. The mood information updates to the social network inform peers of the user on the social network about the mood of the user.

In some embodiments, the social network may also use the mood information to enhance interaction between users of the social network. For example, processing circuitry 306 of a server hosting the social network may determine that the mood information for a first user has been set to "depressed" for a predetermined threshold of time, such as a week. In response, processing circuitry 306 may send a message to a second user who is connected to the first user on the social network, informing that the first user is depressed and recommending that the second user communicate with the first user to affect the mood of the first user. The communication may be a text message, e-mail, voice mail, online greeting card, or any other suitable communication or combination thereof.

As an example, processing circuitry 306 of a server hosting the social network may determine that the mood information for a first user has changed to "angry." In response, processing circuitry 306 may warn users attempting to communicate with the first user that the first user is angry. For example, in response to receiving a request from a second user to send a message to a first user having mood information set to angry, processing circuitry 306 of the server displays a warning message indicating that the first user is angry. The processing circuitry may continue to display these warnings until the mood of the first user is changed to a mood that is calmer than angry.

In some embodiments, a ring tone corresponding to a first user may be modified as a function of the mood of the first user, which may be determined based on mood information posted to a social network as described above. For example, in response to receiving a request from the first user to access a primary content asset associated with an angry mood, processing circuitry of a primary user device may post first mood information to a first social network account of the first user. A second user device of a second user, such as a smart phone, may modify a first ringtone corresponding to the first user as a function of the mood information posted on the social network. For example, processing circuitry of a second user device may access the first social network account of the first user and retrieve the first mood information. In response to retrieving the mood information, processing circuitry of the second user device may change a ringtone corresponding to the first user to indicate that the first user is angry. The ringtone may include audio, images, video or any other suitable content that may be played or displayed on a personal user device.

In some implementations, processing circuitry of the second user device may display an indicator or message next to a first user listing in an address book, indicating mood information for a first user associated with the first listing. The indicator may inform a second user of the second user device of the mood of the first user. For example, processing circuitry of the second user device may display a message "You're about to call your boss, Monty Gollum, but he's pissed . . . you sure you want to do that?" in response to retrieving mood information from a social network account of a first user, Monty Gollum, indicating that Monty Gollum is angry. If the second user sees that the first user is angry, he may decide not to call the first user.

In some embodiments, mood information about a user may be used in the search and selection of relevant supplemental content asset, previously described in reference to step 850 of FIG. 8. For example, a user may access an action video game on a gaming console located near a secondary stereo device. If the user is in an angry mood, the processing circuitry of a secondary stereo device may return songs related to a heavy metal category that is associated with anger and action. If the user is in a calm mood, processing circuitry of the stereo may return songs related to fast-paced classical music that is associated with action.

In some embodiments, mood information may be used to make recommendations for content to be accessed. For example, processing circuitry of a user device may determine a user's mood by retrieving the mood information from a social network. Based on the mood information, the processing circuitry of the user device may display recommended content with mood metadata corresponding to the user's mood information.

In some embodiments, mood information may be used to select a supplemental content asset that is relevant to a primary content asset. For example, processing circuitry 306 of a primary user device may retrieve mood information about a user from a social network, and transmit that information to a secondary device, for use in searching for relevant content assets by mood. For example, the secondary device may search for content assets with mood metadata information that matches the user's mood. In some embodiments, processing circuitry 306 of a primary user device may determine mood information of a primary content asset accessed by a user and transmit that mood information to a secondary device for use in searching for relevant content assets by mood.

In some embodiments, mood information may be used to modify the viewing environment of a user. Systems and methods for customizing viewing environment preferences are discussed in greater detail in connection with Hays, U.S. patent application Ser. No. 13/172,533, filed Jun. 29, 2011, which is hereby incorporated by reference herein in its entirety. For example, settings of viewing environment devices such as lights, window blinds, or any other suitable viewing environment device that modifies an aspect of the user's viewing environment may be modified as a function of the user's mood, or the mood of an accessed primary content asset. For example, if processing circuitry of a primary user device determines that a user is in a happy mood, or that a primary content asset accessed by a user corresponds to a happy mood, the processing circuitry of the primary user device may modify the settings of viewing environment devices such as lights for maximum brightness to create a cheery environment. If a primary user device determines that a user is in a sad mood, or that a primary content asset accessed by a user corresponds to a sad mood, the primary user device may modify the settings of viewing environment devices such as lights for minimum brightness to create a gloomy environment.

In some embodiments, a secondary device may synchronize presentation of a relevant supplemental content asset with the primary user device. For example, a stereo may start playing a movie soundtrack at a certain scene in a video game being accessed on the primary gaming console. At step 870, a secondary device sends a feedback information message to the primary user device. The feedback information message may indicate the number and type of relevant content that has been found. The number of relevant content found may range from 0 to the number of content available on the secondary devices. The feedback information message may include a timestamp at which the secondary device may start presentation of the supplemental content asset. At a secondary device, processing circuitry 306 may transmit a message on I/O path 302 across communications network 414 to the primary user device.

At step 880, processing circuitry of the secondary device polls to determine whether a synchronization message containing synchronization information has been received from the primary user device. The synchronization message may include a timestamp and timeline. The timestamp may indicate a time for the secondary device to start presentation of supplemental content asset. If the secondary device provides a playlist of supplemental content asset, the timeline may include markers to indicate when different supplemental content assets from the playlist should be played back. At the secondary device, processing circuitry 306 may receive the synchronization message from I/O path 302. If the message has been received from the primary user device, the process will continue to step 890. If the message has not yet been received from the primary user device, the process will loop at step 880.

At step 890, processing circuitry of the secondary device presents the relevant content to the user. For example, a stereo device may start playback of a movie soundtrack as a supplemental content asset to accompany a video game accessed on a primary user device. The message received at step 880 may include information such as start time of playback, and a timeline for playback of the device. Processing circuitry 306 of the secondary device may direct the speakers to play back the soundtrack. In some embodiments, playback information may be used in the presentation of supplemental content. As described above, playback information may indicate the status and elapsed playback time for a primary content asset. To more harmoniously present the supplemental content asset, processing circuitry 306 of the secondary device may adjust the start time for play back of the supplemental content asset by an offset comparable to the elapsed playback time of the playback information received in step 830 or 840, or an offset comparable to the timing information received as part of the synchronization message in step 880.

Figure 9:
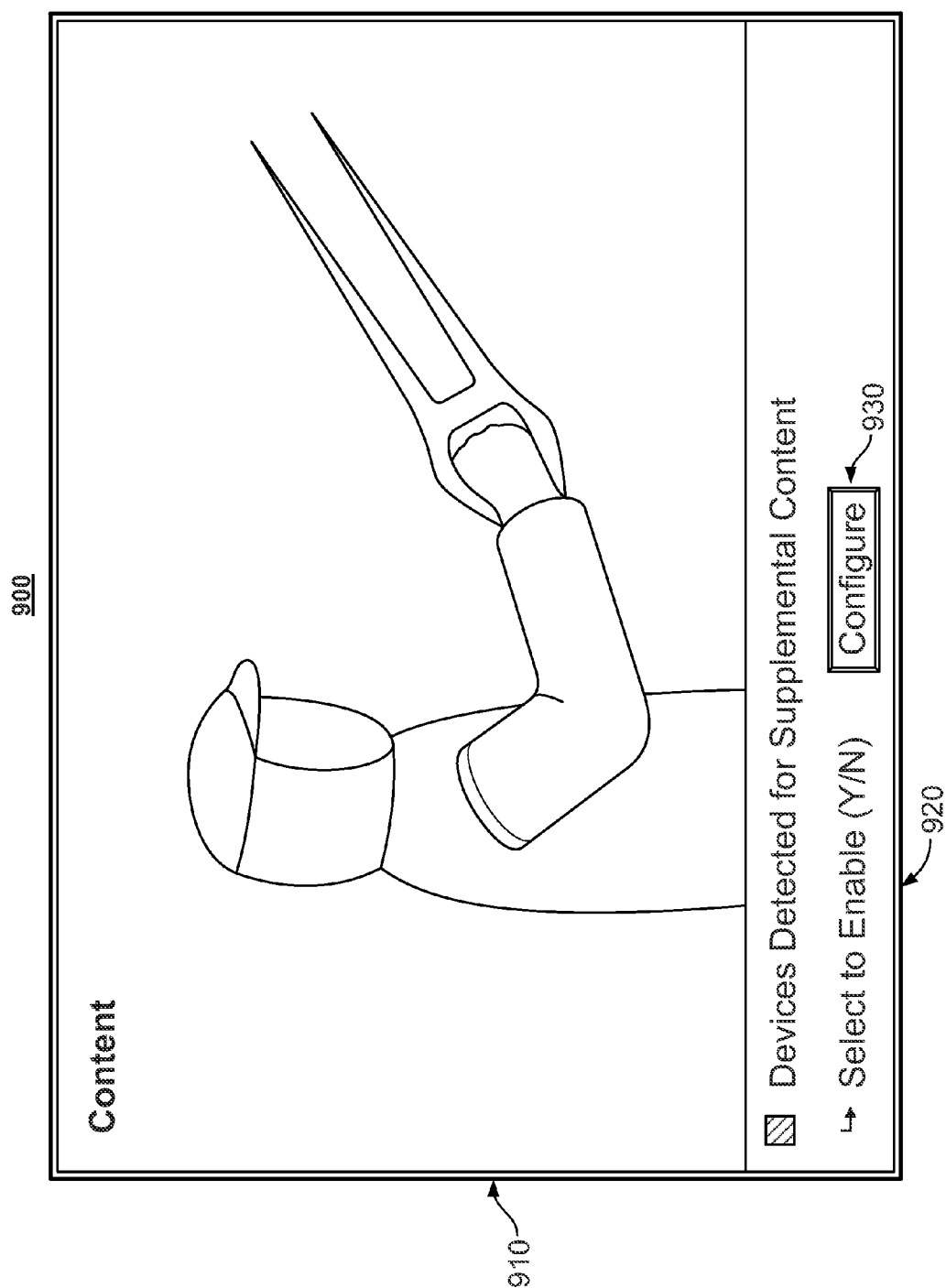
FIG. 9 illustrates an example of a display screen that may be shown on a primary user device that accesses a primary content asset that may be supplemented, or shown on a secondary device that provides a supplemental content asset in accordance with some embodiments of the present disclosure.

FIG. 9 illustrates an example of a display screen that may be displayed to a user on a primary user device or secondary device that provides a supplemental content asset in accordance with some embodiments of the present disclosure. Display screen 900 may include a content display window 910, a message prompt 920 and a configure menu button 930. In some embodiments, the display screen of FIG. 9 may be shown to a user on a primary user device. For example, when a user is operating a gaming console or loading a video game on a gaming console, display 900 may be shown to a user on a display device connected to the gaming console. The display informs the user that secondary devices may be available to provide a supplemental content asset (e.g., audio soundtracks, slide shows, advertisements, etc.) while the user is playing the video game.

Content display window 910 may display a primary content asset that is to be supplemented by a supplemental content asset from a secondary device. Content display window 910 may display a supplemental content asset from a secondary device. When a user accesses content on a primary user device, a prompt may be displayed to the user indicating that secondary devices have been detected that are able to provide a supplemental content asset to the primary content asset accessed on the primary user device. In some implementations, a prompt 920 may be displayed querying whether the user would like to enable the providing of a supplemental content asset. In other implementations, the supplemental content asset may be enabled automatically. Configure button 930 may enable a user to modify settings of a secondary device, to configure how a supplemental content asset is provided and what kind of supplemental content asset is provided. Configure button 930 may enable a user to modify settings of the primary user device to configure what information is transmitted in a content information message to a secondary device. For example, a user may modify a message template to specify that only audio content should be provided as a supplemental content asset. Configure button may bring up the display screen 1000 of FIG. 10.

In some embodiments, the display screen 900 of FIG. 9 may be displayed to a user by a secondary device. The display screen 900 may alert a user of a secondary device to other secondary devices that may provide a supplemental content asset, or to detected primary user devices that may be supplemented by the secondary device. For example, a system of secondary devices may include a television which acts as a nexus, a set-top box, a television, and a stereo. The display 900 may be shown to a user on the television display to indicate that there are other secondary devices (e.g., the set-top box and stereo) that may provide a supplemental content asset. The display 900 may be shown to a user to indicate that there may be one or more primary user devices (e.g. a gaming console) for which a supplemental content asset may be provided by the secondary device or secondary devices. Media display window 910 may show a content asset currently being accessed by the secondary device, the primary content asset accessed at the primary user device, or a supplemental content asset accessed from the secondary device that may be related to the primary content asset.

In response to receiving a request to access a content asset, a primary user device may transmit a content information message to a secondary device. At the secondary device, processing circuitry 306 may receive the content information message from I/O path 302. In response to receiving the content information message, processing circuitry 306 may direct display 312 to show the display screen 900 to the user. Processing circuitry 306 may direct display 312 to display menu prompt 920 to the user querying whether the user would like to enable the secondary equipment to supplement the primary content asset accessed at the primary user device. Processing circuitry 306 may direct display 312 to display configuration button 930 that enables a user to configure settings of the secondary device. Processing circuitry 306 may direct display 312 to show content window 910 that displays a primary content asset or a supplemental content asset. The display of a supplemental content asset will be discussed in further detail in reference to FIG. 13.

In some embodiments, a prompt message indicating that devices are detected for providing a supplemental content asset may be displayed by a secondary nexus device in response to detecting other slave secondary devices, or in response to detecting primary user devices. For example, secondary set-top box 510 may act as a secondary nexus device and detect a slave secondary stereo device 530 and a slave secondary television equipment 520. In response to detecting other slave secondary devices, secondary set-top box 510 may show screen 900 to a user on secondary television equipment 520. At the secondary nexus device, processing circuitry may receive information messages from other slave secondary devices from I/O path 302, and in response transmit a command on I/O path 302 across communications network 414 to slave secondary television equipment 520 to display screen 900 to the user. Slave secondary television equipment 520 may receive the command on I/O path 302 from communications network 414 and display screen 900 on display 312 of slave secondary television equipment.

Figure 10:
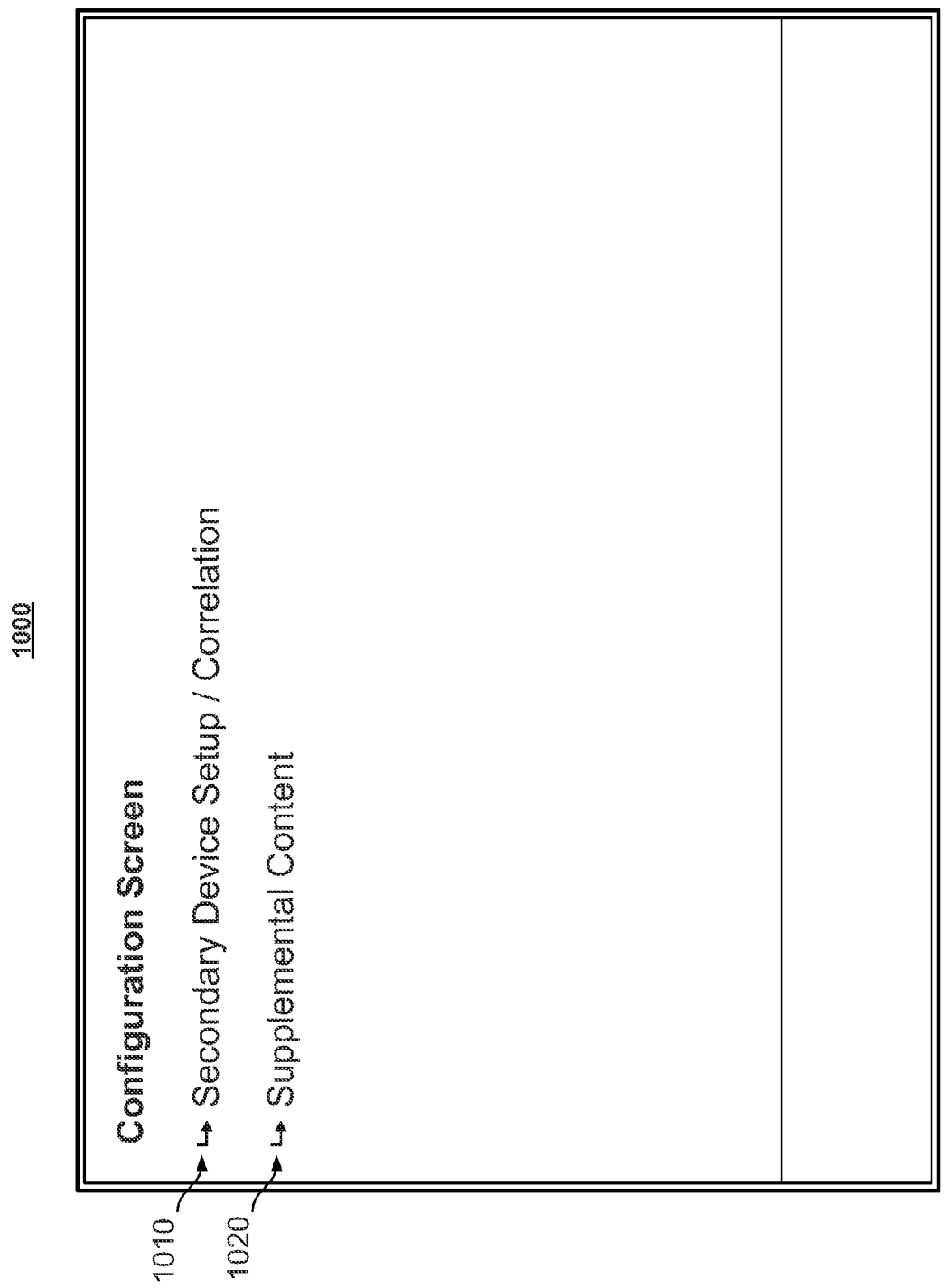
FIG. 10 illustrates an example of a display screen that may be shown to a user on a primary user device or secondary device to configure the providing of a supplemental content asset in accordance with some embodiments of the present disclosure.

FIG. 10 illustrates an example of a display screen that may be shown to a user on a primary user device or secondary device to configure what supplemental content asset is provided and how the supplemental content asset is provided in accordance with some embodiments of the present disclosure. For example, configuration screen 1000 may be shown to a user of a primary gaming console on a display device output from the primary gaming console. Configuration screen 1000 may be shown to a user of a primary laptop computer.

In some embodiments, configuration screen 1000 of FIG. 10 may be displayed to a user in response to selection of configuration button 930 from display screen FIG. 9. For example, configuration screen 1000 may be shown to a user of a primary gaming console after accessing a video by the gaming console in response to receiving a user input of the configuration button 930. Configuration screen 1000 may be shown to a user of a secondary nexus device, in response to receiving a user input of configuration button 930.

At the secondary nexus device, in response to receiving a user input from user input interface 310 indicating selection of configuration button 930, processing circuitry 306 may transmit a command to slave secondary television equipment 520 to display the configuration screen 1000 of FIG. 10. In some embodiments a single secondary device may receive the input and display the command screen. For example, at secondary television equipment 520, processing circuitry 306 may receive an input from user input interface 310 indicating selection of configuration button 930 from display screen 900 of FIG. 9. In response, processing circuitry 930 may show configuration screen 1000 on display 312.

Configuration screen 1000 may display two menu items: a secondary device/correlation set up button 1010, and a supplemental content asset button 1020. In response to selection of button 1010, a user device may display set-up screen 1100 of FIG. 11 to a user. In response to selection of button 1020, a user device may display selection screen 1200 of FIG. 12 to a user. At a user device, processing circuitry 306 may receive an input from user input interface 310 indicating selection of a configuration button 1010, and in response output set-up screen 1100 on display 312. At a user device, processing circuitry 306 may receive an input from user input interface 310 indicating selection of a configuration button 1020, and in response output set-up screen 1200 on display 312.

Figure 11:
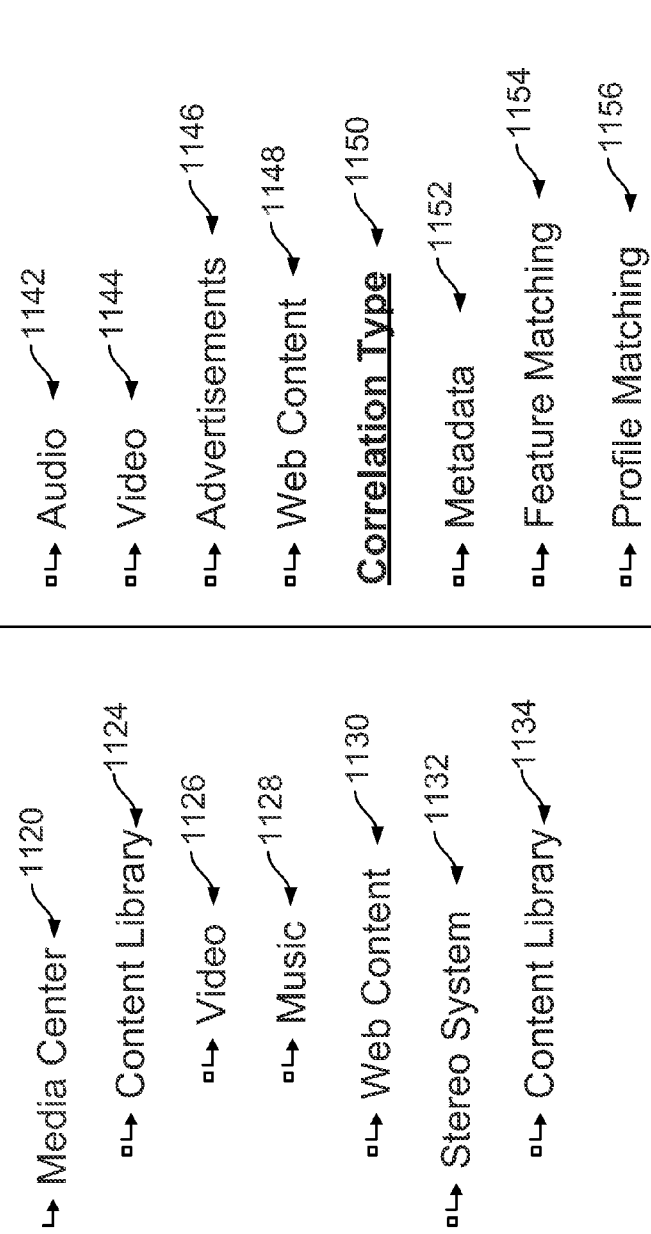
FIG. 11 illustrates an example of a display screen that may be shown to a user on a primary user device or secondary device to set up the providing of a supplemental content asset in accordance with some embodiments of the present disclosure.

FIG. 11 illustrates an example of a display screen 1100 that may be shown to a user on a primary user device or secondary device to set up the providing of a supplemental content asset in accordance with some embodiments of the present disclosure. For example, a user may own a primary gaming console, and a system of secondary devices including a set-top box which acts as a nexus, a stereo and a DVD player. From set-up screen 1100, a user may select secondary devices that provide a supplemental content asset (e.g. stereos, set-top boxes, laptop computers), type of a supplemental content asset (e.g. audio, video, advertisements, web content, etc), and how the supplemental content asset is selected (e.g. metadata, feature-matching, profile matching).

In some embodiments, set-up screen 1100 allows a user to enable, disable or select specific secondary devices to be used to supplement content. Submenu 1110 may enumerate content sources that include a set-top box media center, represented by menu item 1120, and a stereo system represented by menu item 1132. The media center may be implemented in a secondary set-top box device 510. The stereo system may be implemented in a secondary stereo device 530.

A user may browse through a series of selectable options and drop-down menus to navigate set-up screen 1100. As described in reference to step 820 of FIG. 8, the media center may include a database of content listings that is represented by content library menu item 1124. A user may navigate the secondary device submenu 1110 of screen 1100 by selecting the media center menu item 1120, and opening the content library menu item 1124. Within content library menu item 1124, a user may select video menu item 1126, or music menu item 1128. In some embodiments, selecting the video menu item 1126 may bring up a listing of relevant video content, and selecting music menu item 1128 may bring up a listing of relevant music content. The media center menu item may also contain a web content menu item 1130. In some embodiments, the media center may be able to access web pages, flash videos or other Internet content that is relevant to the primary content asset accessed on the primary user device.

Under the stereo system menu item 1132, there may also be content library menu item 1134, different from the content library menu item 1124 corresponding to the media center. The stereo system content library corresponds to content that is stored on the stereo system, unlike the media center content library which corresponds to content stored or accessible by the media center. In some embodiments, the stereo system content library may be incorporated into the media center content library. For example, when a stereo system is a slave secondary device to a secondary nexus device, the secondary nexus device may generate a database or content library that includes content from all slave devices.

In some embodiments, set-up screen 1100 allows a user to select types of content to provide as a supplement to a primary content asset accessed at the primary user device. For example, supplemental content asset menu 1140 may include selectable menu items for audio type content 1142, video type content 1144, advertisements content 1146, and web content 1148. Audio type content may include mp3 files, wav files, or any suitable music or audio file. Video type content may include AVI files, MPEG files, 3gp files or any suitable video file. Web type content may include websites, flash files, shockwave files, applets or any other suitable Internet related content. Advertisements may include an audio content, video content or web content.

In some embodiments, set-up screen 1100 allows a user to select options from correlation type menu 1150 used to determine correlation and relevancy of supplemental content asset items stored at a secondary device to a content asset accessed on a primary user device. As described above in reference to step 850 of FIG. 8, the relevancy of supplemental content asset items to a content asset accessed on a primary user device may be determined using various information, including metadata of the content, features extracted from the content, and user profile information, as described above in reference to step 820 of FIG. 8.

In some embodiments, a user may selectively enable or disable each of the menu items shown in set-up screen 1100. The user has flexibility to enable and disable various menu options. For example, a user may decide to enable the media center menu item 1120 and disable the stereo system menu item 1132. This limits the selection of a supplemental content asset to the content assets provided by the media center. As an example, a user may limit the content types under supplemental content menu 1140 to video content by enabling video menu item 1144, or to audio content enabling audio menu item 1142.

Figure 12:
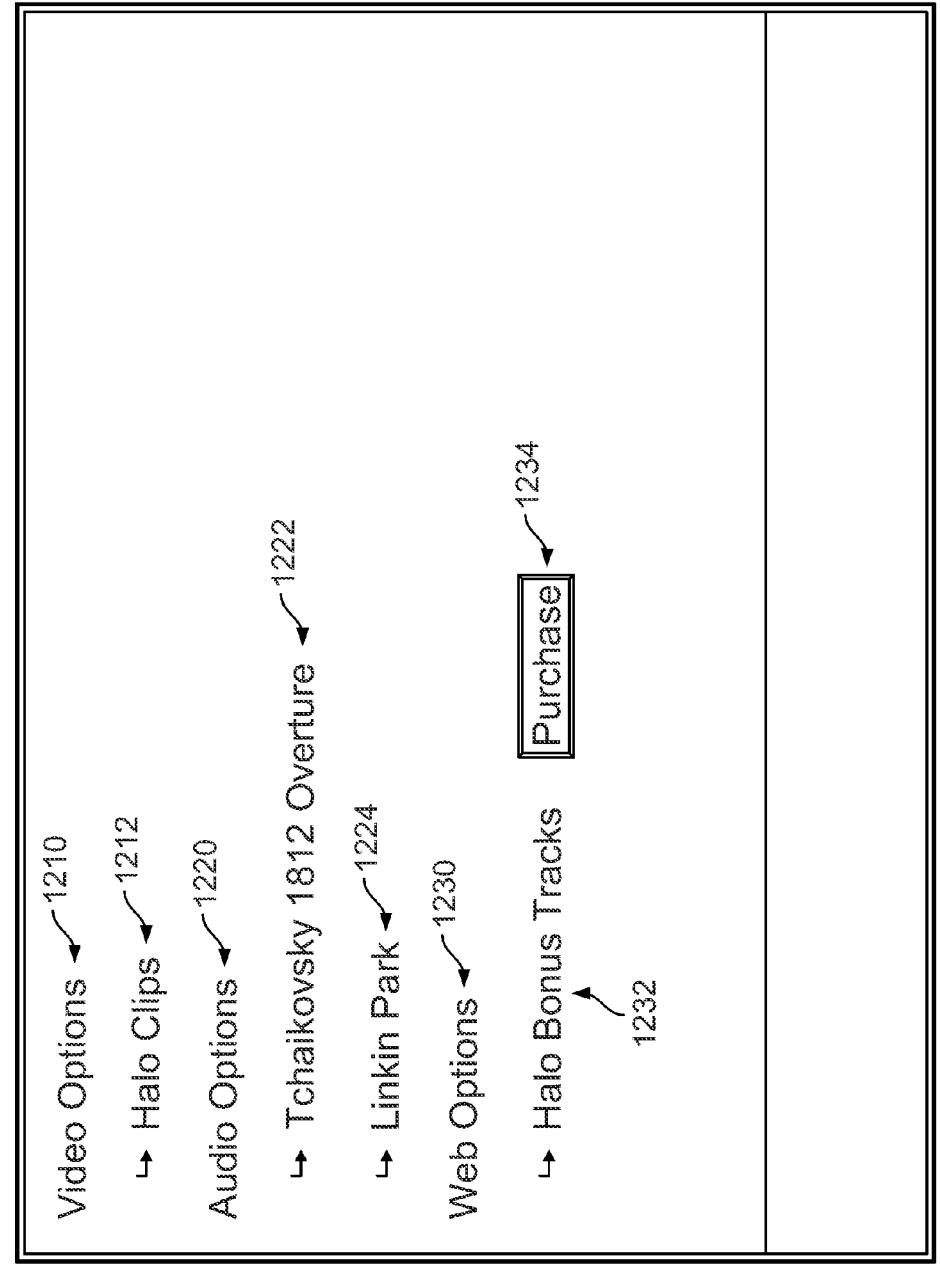
FIG. 12 illustrates an example of a display screen that may be shown to a user on a primary user device or secondary device to select a supplemental content asset in accordance with some embodiments of the present disclosure.

FIG. 12 illustrates an example of a display screen 1200 that may be shown to a user on a primary user device or secondary device to select supplemental content asset in accordance with some embodiments of the present disclosure. For example, a user of a primary gaming console may select the type of supplemental content asset or specific supplemental content asset from selection screen 1200 to accompany a primary video game accessed on the gaming console. The user may be playing an action video game. The relevant supplemental content asset listings in display screen 1200 correspond to action themes or fast-paced music.

Display screen 1200 may be shown to a user by a user device in response to receiving an input from a user indicating selection of supplemental content asset button 1020 in display screen 1000 of FIG. 10. Display screen 1200 shows a listing of relevant content items under several different content types. The relevant content items may have been determined as a result of a search for relevant content items as part of step 850 of FIG. 8. For example, the relevant content items listed in display screen 1200 may have been determined based on searching for content items relevant to a video game. Video options menu item 1210 provides a listing of video content that is relevant to the accessed primary content asset on the primary user device. In this example, menu item 1212 refers to video clips.

Audio options menu item 1220 provides a listing of audio content that is relevant to the accessed primary content asset on the primary user device. In this example, menu item 1222 refers to Tchaikovsky's "1812 Overture," and menu item 1224 refers to a playlist by Linkin Park. In some embodiments, the menu items may refer to playlists such as menu item 1224. In some embodiments the menu items may refer to individual content files. In some embodiments, playlists may be generated based on the relevant content. For example, if more than one audio content is listed under audio options menu item 1220, the secondary device may be able to combine the several files into a playlist.

Web options menu item 1230 provides a listing of content that is relevant to the primary content asset accessed on the primary user device. In this example, web options include a menu item referring to soundtracks that may be streamed or downloaded from the Internet. In some embodiments, users may purchase content that may be streamed or downloaded. Menu item 1234 is a button that enables a user to purchase content from the Internet. In some embodiments, users may subscribe to short-term licenses for audio files or video files that may be protected by digital rights management (DRM). Users may periodically renew licenses to this content. A menu item similar to the purchase menu item 1234 may be displayed next to the content that requires a paid subscription. For example, processing circuitry 306 of a user device may receive a request from a user to purchase a content asset. In response to receiving the request, processing circuitry 306 may transmit a purchase request to a content source on the Internet. The purchase request may include metadata, user profile information, or any other suitable information. In some implementations, the user device may be a primary user device. In some implementations the user device may be a secondary device. In some implementations, the processing circuitry of a primary user device may receive a purchase request from a user, and transmit the purchase request to a second device. In response to receiving the purchase request, processing circuitry of the secondary device may transmit information to a content source on the Internet.

In some embodiments each of the menu items in display screen 1200 may be individually selected to enable or disable the supplemental content asset. The ability to present multiple supplemental content assets to a user will be discussed in reference to FIG. 13.

FIG. 13 illustrates an example of a display screen that may be shown to a user on a secondary device displaying a supplemental content asset in accordance with some embodiments of the present disclosure. For example, a primary user device may be a portable gaming device, accessing a song as a primary content asset. A secondary television equipment may display a music video as a supplemental content asset in content window 1140, as accompaniment to the playback of the song on the primary portable gaming device.

In some embodiments, display screen 1300 may be shown to a user on a primary user device. For example, if the primary user device is a television equipment that also serves as a display for secondary set-top box 510, the supplemental content asset may be displayed in a separate window or overlay, along with a primary video content. In some embodiments, display area 1340 may show a primary content asset accessed from a primary user device. For example, when a user is playing a video game with primary gaming console 550, the video may be output to secondary television equipment 520. In this example, a supplemental content asset in the form of advertisements and audio content may be presented to the user through secondary television equipment 520, secondary set-top box 510, and secondary stereo device 530. Audio content may be played back by secondary stereo device 530 or secondary television equipment 520 through speakers 540.

In some embodiments, multiple supplemental content asset may be presented to the user in display screen 1300. For example, display region 1320 may show an advertisement accessed from the Internet, or from remote content source 416. Display region 1310 may indicate that the secondary device is providing a supplemental content asset. Time bar 1330 may be presented to the user to assist in synchronizing the presentation of a supplemental content asset and the accessed primary content asset. For example, relevant supplemental content asset may be a playlist consisting of several audio content files. Markers 1332, 1334, 1336 and 1338 may denote transition points between the parts of the playlist. In some embodiments, the timebar may represent notable transition points in the primary content asset accessed by the primary user device. In these embodiments, if the relevant content is a playlist, the markers may indicate points at which each audio content file may start or finish. In some embodiments, the duration between transition points may be shorter than the audio content in a playlist. In these embodiments, the transition between audio content may be smoothed by a fade-in and fade-out of volume.

In some embodiments, supplemental video content may be displayed in display region 1140 instead of a primary content asset accessed at the primary user device. For example, a user may wish to play a music file on a primary PDA device 570. In response to receiving content information messages about the content, secondary set-top box 510 may select video clips to supplement the audio content accessed by the primary user device.

FIG. 14 illustrates an example of a display screen that may be shown to a user on a secondary device displaying a supplemental content asset in accordance with some embodiments of the present disclosure. For example, a user may play a game on a primary user device such as a tablet personal computer (PC). A secondary device such as television equipment 520 may provide a collection of a supplemental content asset to enhance the user experience of playing the game.

In some embodiments, display screen 1400 may be shown to a user on a secondary device, such as a television, in response to accessing a video game on a primary tablet PC. For example, a tablet PC may enable a user to play a car racing game. The amount of information that may be displayed to a user may be limited by the screen size of the tablet PC. Processing circuitry 306 of the primary tablet PC may communicate with secondary set-top box 510 to access supplemental web content from the Internet that is relevant to the game. The primary tablet PC may be used by a user to steer and drive along a course in the racing game. A supplemental content asset may be displayed on secondary television equipment 520 by secondary set-top box 510. In some embodiments, the tablet PC may enable the user to compete with other players over the Internet. For example, processing circuitry 306 of the tablet PC may receive input from a user while playing the game and communicate information over a communications network with other tablet PCs, to exchange information about the status of different competing players at each tablet PC. The display 1400 may include a display of an overhead map of the racing course 1410, rankings of players and fastest times 1420, a listing of friends currently playing the racing game 1430, title of the racing game 1440, and an advertisement 1450. Selectable region 1460 may include selectable menu options that enable a user to access any of the configurations and set-up screens of FIG. 10, FIG. 11 and FIG. 12.

In some embodiments, audio may be provided as a supplemental content asset. A system of secondary devices that include at least a set-top box and stereo can provide enhanced sound effects. The set-top box may access the sound effects from a remote media server that is communicated from the primary user device that contains sound effects specific to the racing game. The set-top box may then play back the sound effects in coordination with game play on the tablet PC.

In some embodiments, any of display screens 900, 1000, 1100, 1200, 1300 or 1400, as show in FIG. 9, 10, 11, 12, 13, or 14, respectively, may be customized depending on the mood of the user of the primary user device, or the mood of the primary content asset. The customization may be implemented as different skins that modify the graphical user interface (GUI) and appearance of the display screen. For example, in response to determining that a user is in a sad mood, or that the primary content asset corresponds to a sad mood, processing circuitry 306 of a user device may direct display 212 to show dark color schemes for buttons and borders. As described above, processing circuitry 306 of a user device may determine mood information based on: user profile information stored on the user device or retrieved from a remote source, user profile or mood information retrieved from an online social network, or the primary content asset accessed by the user.

FIG. 15 illustrates an example of a data structure of an information message 1500 for transmitting information between a primary user device and a secondary device in accordance with some embodiments of the disclosure. For example, the information may be communicated about a primary content asset accessed on a primary user device for determining how and what supplemental content asset is provided by a secondary device. The data structure may include metadata 1510, user profile information 1530, supplement request information 1540, feature information 1550, synchronization information 1560, capabilities information 1570, and playback information 1580. Metadata 1510 may include information from a header 1520 of the content such as title, genre, content type or any other suitable metadata information. User profile information 1530 may include user name, gender, age, race, preference information, or any other suitable user profile information.

In some embodiments, the data structure may also include a Supplement Request field 1540 that denotes the content type that is preferred for the supplemental content asset. For example, if a user is playing a song on a primary PDA device 570, the user may request video content to supplement the song. As an example, if a user is playing a video game on a primary gaming console 540, the type of a supplemental content asset preferred may be a soundtrack played back on secondary stereo equipment 530.

In some embodiments, feature information 1550 may be included with the information message. Acoustic features and visual features information may be extracted from the accessed primary content asset. For example, if the accessed primary content asset is a song, MFCCs may be extracted from a Fourier spectrum of the song. These MFCCs provide information about the frequency band components of the song. The beat or cadence of the song may be extracted by quantifying low frequency components of a Fourier spectrum of the song. This may be used to match the song to relevant music videos or other audio files that have similar characteristics. In FIG. 15, feature information 1550 includes a magnitude measurement of a bass component.

In some embodiments, synchronization information 1560 may be included in an information message. Synchronization information messages and feedback information messages were previously described in connection with FIG. 7 and FIG. 8. The structure of those messages may be similar to message 1500. The synchronization information may include a timestamp 1561 indicating when a primary or a supplemental content asset should be presented. For example, timestamp 1561 indicates that a supplemental content asset should be played at one minute and 10 seconds after the primary content asset is played back. The synchronization information may include a timeline with markers that indicate when a supplemental content asset should be presented to supplement a primary content asset. The timeline may be communicated in the message as an array of offsets 1562 from timestamp 1561, and an array of content indices 1563 that correlate with a supplemental content asset. For example, array 1563 indicates that a supplemental content asset corresponding to index 1 should be played back at timestamp 1561, a supplemental content asset corresponding to index 2 should be played back at five minutes after timestamp 1561, and a supplemental content asset corresponding to index 3 should be played back at fifteen minutes after timestamp 1561. In some implementations, the same audio clip may be played at each marker, or a series of different audio clips in a playlist may be played at each marker.

In some embodiments, capabilities information 1570 may be included in an information message, such a device information as discussed previously in reference to FIG. 7. As described previously in reference to step 720 of FIG. 7, the capabilities field 1570 may be included in a device information message to communicate the abilities of a secondary device. As described in reference to step 730 of FIG. 7, processing circuitry 306 of a user device may create a message template based on the capabilities information received from a secondary device. Capabilities information may include information about the types of content a user device is able to present. For example, the capabilities information corresponding to a stereo device may indicate that the device supports audio only. The capabilities information corresponding to a laptop computer may indicate that the laptop supports audio and video. For example in FIG. 15, capabilities information includes supported content tags 1571 and 1572. Supported content tag 1571 indicates that a user device supports audio content, and supported content tag 1572 indicates that the user device supports video content.

In some embodiments, playback information 1580 may be included in an information message, such as a content information message, probe response message, probe message, beacon message, feedback information message or synchronization information message. The status field 1580 indicates the status of a content asset on a user device and may be any one of paused or playing back. Paused indicates that the content asset on a user device transmitting the playback information is currently paused. Playing back indicates that the content asset on the user device is currently playing. Play time field 1582 indicates the elapsed playback time of the content asset. Total time field 1583 indicates the total time duration for playback of the content asset. The playback information may be used to synchronize presentation of supplemental content assets and primary content assets, in particular when primary content assets have been partially played back. For example, if the primary content asset has been played half way, the secondary device may start playback of the supplemental content asset at halfway through the total time duration of the supplemental content asset.

The above described embodiments of the present disclosure are presented for purposes of illustration and not of limitation, and the present disclosure is limited only by the claims which follow.

What is claimed is:

1. A method comprising:
   detecting a primary user device within a proximity of a secondary user device;
   receiving, from the primary user device, an electronic communication at the secondary user device, wherein the electronic communication includes playback information about a primary content asset being accessed at the primary user device;
   in response to receiving the electronic communication and while the primary user device is within the proximity of the secondary user device, automatically searching, using the received playback information, a content listings database to identify a content listing that is relevant to the primary content asset, wherein the searching comprises:
      automatically computing, for each content listing in the database, a relevancy metric for a supplemental content asset associated with the respective content listing based on a characteristic of the primary content asset, and
      selecting, as the identified content listing, the content listing associated with the supplemental content asset for which the relevancy metric exceeds a threshold;
   retrieving the supplemental content asset associated with the identified content listing in response to selecting the identified content listing; and
   generating for display at the secondary user device, the retrieved supplemental content asset that is relevant to the primary content asset being accessed at the primary user device, based in part on the received playback information.

2. The method of claim 1, further comprising generating the content listings database, wherein the content listings database includes at least one content listing associated with a supplemental content asset accessible to the secondary user device.

3. The method of claim 2, wherein the secondary user device is a nexus device, further comprising:
   detecting a slave secondary device within a proximity of the nexus device;
   receiving, from the slave secondary device, a second electronic communication,
   wherein the second electronic communication includes content listing information about at least one supplemental content asset accessible to the slave secondary device;
   updating the content listings database, based on the received second electronic communication, to include the content listing information about the supplemental content asset accessible to the slave secondary device.

4. The method of claim 1, wherein the characteristic of the primary content asset comprises metadata, timing information, user profile information, mood information, play back information, or feature information.

5. The method of claim 4, wherein the feature information of the primary content asset or content listing further comprises a feature vector;
   wherein the computing, for each content listing in the database, the relevancy metric for the supplemental content asset associated with the respective content listing further comprises:
      preprocessing a feature vector of the primary content asset.

6. The method of claim 5, wherein the preprocessing further comprises resizing a feature vector, combining elements of a feature vector, or normalizing a feature vector;
   and wherein the computing the relevancy metric further comprises calculating a result vector.

7. The method of claim 4 wherein the feature information comprises a mel-frequency cepstral coefficient, cepstral coefficient, formant, frequency, brightness, contrast, color range, edge count, or corner count.

8. The method of claim 1 further comprising:
   generating, using a processor, a feedback information message that includes metadata, or timing information about the identified content listing; and
   transmitting the feedback information message to the primary user device.

9. The method of claim 1 further comprising:
   receiving, from the primary user device, a synchronization information message, wherein the synchronization information message includes timing information; and
   the presenting of the retrieved supplemental content asset is in response to receiving the synchronization information message and based on the timing information included in the synchronization information message.

10. The method of claim 1, further comprising:
    receiving from the primary user device a request to purchase a content asset from a content source over the Internet.

11. A secondary user device comprising:
    storage; and
    control circuitry configured to:
       detect a primary user device within a proximity of the secondary user device;
       receive, from an I/O path, an electronic communication from the primary user device, wherein the electronic communication includes playback information about a primary content asset being accessed at the primary user device;
       in response to receiving the electronic communication and while the primary user device is within the proximity of the secondary user device, automatically search, using the received playback information, a content listings database to identify a content listing that is relevant to the primary content asset, by:
          automatically computing, for each content listing in the database, a relevancy metric for a supplemental content asset associated with the respective content listing based on a characteristic of the primary content asset, and
          selecting, as the identified content listing, the content listing associated with the supplemental content asset for which the relevancy metric exceeds a threshold;
       retrieve the supplemental content asset associated with the identified content listing in response to selecting the identified content listing; and generate for display at the secondary user device, the retrieved supplemental content asset that is relevant to the primary content asset being accessed at the primary user device, based in part on the received playback information.

12. The secondary user device of claim 11, wherein the control circuitry is further configured to:
generate the content listings database, wherein the content listings database includes at least one content listing associated with a supplemental content asset accessible to the secondary user device.

13. The secondary user device of claim 12, wherein the secondary user device is a nexus device, and the control circuitry is further configured to:
detect a slave secondary device within a proximity of the nexus device;
receive, from the slave secondary device, a second electronic communication,
wherein the second electronic communication includes content listing information about at least one supplemental content asset accessible to the slave secondary device;
update the content listings database, based on the received second electronic communication, to include the content listing information about the supplemental content asset accessible to the slave secondary device.

14. The secondary user device of claim 11, wherein the characteristic of the primary content asset comprises metadata, timing information, user profile information, mood information, play back information or feature information.

15. The secondary user device of claim 14, wherein the feature information of the primary content asset or content listing further comprises a feature vector; wherein the control circuitry is further configured to:
preprocess a feature vector of the primary content asset.

16. The secondary user device of claim 15, wherein the control circuitry is further configured to:
resize a feature vector, combine elements of a feature vector, or normalize a feature vector;
and calculate a result vector to compute the relevancy metric.

17. The secondary user device of claim 14 wherein the feature information comprises a mel-frequency cepstral coefficient, cepstral coefficient, formant, frequency, brightness, contrast, color range, edge count, or corner count.

18. The secondary user device of claim 11, wherein the control circuitry is further configured to:
generate, using a processor, a feedback information message that includes metadata, or timing information about the identified content listing; and
transmit the feedback information message to the primary user device.

19. The secondary user device of claim 11, wherein the control circuitry is further configured to:
receive, from the primary user device, a synchronization information message, wherein the synchronization information message includes timing information and the presenting the retrieved supplemental content is in response to receiving the synchronization information message and based on the timing information included in the synchronization information message.

20. The secondary user device of claim 11, wherein the control circuitry is further configured to:
receive, from the primary user device, a request to purchase a content asset from a content source over the Internet.

21. A non-transitory computer-readable media, the computer-readable media comprising machine-readable instructions encoded thereon for:
detecting a primary user device within a proximity of a secondary user device;
receiving, from the primary user device, an electronic communication at the secondary user device, wherein the electronic communication includes playback information about a primary content asset being accessed at the primary user device;
in response to receiving the electronic communication and while the primary user device is within the proximity of the secondary user device, automatically searching, using the received playback information, a content listings database to identify a content listing that is relevant to the primary content asset, wherein the searching comprises:
automatically computing, for each content listing in the database, a relevancy metric for a supplemental content asset associated with the respective content listing based on a characteristic of the primary content asset, and
selecting, as the identified content listing, the content listing associated with the supplemental content asset for which the relevancy metric exceeds a threshold;
retrieving the supplemental content asset associated with the identified content listing in response to selecting the identified content listing; and
generating for display at the secondary user device, the retrieved supplemental content asset that is relevant to the primary content asset being accessed at the primary user device, based in part on the received playback information.

22. A method comprising: detecting a primary user device within a proximity of a secondary user device; receiving, from the primary user device, an electronic communication at the secondary user device, wherein the electronic communication includes playback information about a primary content asset being accessed at the primary user device; in response to receiving the electronic communication and while the primary user device is within the proximity of the secondary user device, automatically searching, using the received playback information, for a supplemental content asset associated with the primary content asset; automatically computing a relevancy metric for the supplemental content asset associated with a content listing in a database based on a characteristic of the primary content asset; and generating for display at the secondary user device, the retrieved supplemental content asset that is relevant, based on the computed relevancy metric, to the primary content asset being accessed at the primary user device, based in part on the received playback information.

23. A secondary user device comprising: storage; and control circuitry configured to: detect a primary user device within a proximity of the secondary user device; receive, from an I/O path, an electronic communication from the primary user device, wherein the electronic communication includes playback information about a primary content asset being accessed at the primary user device; in response to receiving the electronic communication and while the primary user device is within the proximity of the secondary user device, automatically search, using the received playback information, for a supplemental content asset associated with the primary content asset; automatically compute a relevancy metric for the supplemental content asset associated with a content listing in a database based on a characteristic of the primary content asset; and generate for display at the secondary user device, the retrieved supplemental content asset that is relevant, based on the computed relevancy metric, to the primary content asset being accessed at the primary user device, based in part on the received playback information.

24. A non-transitory computer-readable media, the computer-readable media comprising machine-readable instructions encoded thereon for: detecting a primary user device within a proximity of a secondary user device; receiving, from the primary user device, an electronic communication at the secondary user device, wherein the electronic communication includes playback information about a primary content asset being accessed at the primary user device; in response to receiving the electronic communication and while the primary user device is within the proximity of the secondary user device, automatically searching, using the received playback information, for a supplemental content asset associated with the primary content asset; automatically computing a relevancy metric for the supplemental content asset associated with a content listing in a database based on a characteristic of the primary content asset; and generating for display at the secondary user device, the retrieved supplemental content asset that is relevant, based on the computed relevancy metric, to the primary content asset being accessed at the primary user device, based in part on the received playback information.

* * * * *